United States Patent
Rengarajan et al.

(10) Patent No.: US 12,348,987 B2
(45) Date of Patent: Jul. 1, 2025

(54) OPTIMIZATION OF DISTRIBUTED WI-FI NETWORKS

(71) Applicant: PLUME DESIGN, INC., Palo Alto, CA (US)

(72) Inventors: Balaji Rengarajan, Campbell, CA (US); William J. McFarland, Portola Vally, CA (US); Qinghai Gao, Sunnyvale, CA (US); Andrea Goldsmith, Menlo Park, CA (US); Vikram Chandrasekhar, Sunnyvale, CA (US); Ritesh K. Madan, Berkley, CA (US); Santhosh Krishna, Sunnyvale, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 18/296,533

(22) Filed: Apr. 6, 2023

(65) Prior Publication Data

US 2023/0247447 A1    Aug. 3, 2023

Related U.S. Application Data

(63) Continuation of application No. 17/394,682, filed on Aug. 5, 2021, now Pat. No. 11,653,230, which is a continuation of application No. 16/032,584, filed on Jul. 11, 2018, now Pat. No. 11,109,244, which is a continuation-in-part of application No. 15/659,969, filed on Jul. 26, 2017, now Pat. No. 10,716,016, and a continuation-in-part of application No. 15/463,154, (Continued)

(51) Int. Cl.
*H04W 24/02* (2009.01)
*H04W 84/12* (2009.01)

(52) U.S. Cl.
CPC ............ *H04W 24/02* (2013.01); *H04W 84/12* (2013.01)

(58) Field of Classification Search
CPC ............................. H04W 24/02; H04W 84/12
See application file for complete search history.

(56) References Cited

U.S. PATENT DOCUMENTS

2007/0263549 A1 * 11/2007 Brinkley ................. H04L 41/12
370/252
2009/0258607 A1 * 10/2009 Beninghaus ......... H04B 1/3805
455/77

(Continued)

FOREIGN PATENT DOCUMENTS

CN            102316570 A  *  1/2012

*Primary Examiner* — Samina F Choudhry
(74) *Attorney, Agent, or Firm* — Nicholas Martin; Greenberg Traurig, LLP

(57) ABSTRACT

Systems and methods for Wi-Fi network optimization include receiving inputs related to signal strength and interference during operation of the Wi-Fi network; performing an optimization to determine operational parameters of one or more access points in the Wi-Fi network, wherein the optimization is based on the inputs and is configured to address an objective associated with the Wi-Fi network; and providing outputs comprising the operational parameters for configuration of the Wi-Fi network, based on the optimization, wherein the operational parameters include channel and bandwidth selection, and topology of the one or more access points.

20 Claims, 19 Drawing Sheets

Related U.S. Application Data filed on Mar. 20, 2017, now Pat. No. 10,051,494, said application No. 15/659,969 is a continuation of application No. 13/857,096, filed on Apr. 4, 2013, now Pat. No. 9,736,703.

(60) Provisional application No. 62/310,596, filed on Mar. 18, 2016, provisional application No. 61/698,426, filed on Sep. 7, 2012, provisional application No. 61/621,316, filed on Apr. 6, 2012.

(56) References Cited

U.S. PATENT DOCUMENTS

| | | | |
|---|---|---|---|
| 2011/0314145 A1* | 12/2011 | Raleigh | H04W 48/16 709/224 |
| 2012/0257585 A1* | 10/2012 | Sydor | H04W 72/541 370/329 |
| 2013/0143541 A1* | 6/2013 | Henderson | H04W 16/24 455/418 |
| 2013/0272285 A1* | 10/2013 | Goldsmith | H04W 24/02 370/338 |

* cited by examiner

P: PRIMARY CHANNEL
Si: SECONDARY CHANNEL i

OPTIMIZATION OF DISTRIBUTED WI-FI NETWORKS

CROSS-REFERENCE TO RELATED APPLICATIONS

The present patent/application is a continuation of U.S. patent application Ser. No. 17/394,682, filed Aug. 5, 2021, entitled "OPTIMIZATION OF DISTRIBUTED WI-FI NETWORKS," which is a continuation of U.S. patent application Ser. No. 16/032,584, filed Jul. 11, 2018 (now U.S. Pat. No. 11,109,244 issued Aug. 31, 2021), and entitled "OPTIMIZATION OF DISTRIBUTED WI-FI NETWORKS," the contents of which are incorporated by reference in their entirety.

U.S. patent application Ser. No. 16/032,584 was a continuation-in-part of U.S. patent application Ser. No. 15/463,154, filed Mar. 20, 2017 (now U.S. Pat. No. 10,051,494 issued Aug. 14, 2018), and entitled "OPTIMIZATION OF DISTRIBUTED WI-FI NETWORKS," which claims priority to U.S. Provisional Patent Application No. 62/310,596, filed Mar. 18, 2016, and entitled "OPTIMIZATION OF DISTRIBUTED WI-FI NETWORKS," the contents of which are incorporated by reference in their entirety.

U.S. patent application Ser. No. 16/032,584 was also a continuation-in-part of U.S. patent application Ser. No. 15/659,969, filed Jul. 26, 2017 (now U.S. Pat. No. 10,716,016 issued Jul. 14, 2020), and entitled "NETWORK CONFIGURATION OF WIFI NETWORKS VIA A CLOUD-BASED WIFI NETWORK MANAGER," which is a continuation of U.S. patent application Ser. No. 13/857,096, filed Apr. 4, 2013 (now U.S. Pat. No. 9,736,703 issued Aug. 15, 2017), and entitled "INTERFERENCE MANAGEMENT AND NETWORK PERFORMANCE OPTIMIZATION IN DENSE WIFI NETWORKS," which claims priority to U.S. Provisional Patent Application No. 61/621,316, filed Apr. 6, 2012, and entitled "INTERFERENCE MANAGEMENT AND NETWORK PERFORMANCE OPTIMIZATION IN DENSE WIFI NETWORKS VIA CLOUD-BASED SON SOFTWARE" and U.S. Provisional Patent Application No. 61/698,426, filed Sep. 7, 2012, and entitled "DYNAMIC CHANNEL SELECTION IN WI-FI NETWORKS," the contents of which are incorporated by reference in their entirety.

FIELD OF THE DISCLOSURE

The present disclosure generally relates to wireless networking systems and methods. More particularly, the present disclosure relates to optimization systems and methods in a distributed Wi-Fi system.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where the range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

BRIEF SUMMARY OF THE DISCLOSURE

In an exemplary embodiment, a method for optimization of access points in a Wi-Fi system by a cloud controller includes receiving inputs related to operation of the Wi-Fi system; performing an optimization based on the inputs to maximize an objective function which maximizes capacity; and providing outputs including operational parameters for the Wi-Fi system based on the optimization. The inputs can include a plurality of traffic load required by each Wi-Fi client device, signal strength for each possible link, data rate for each possible link, packet error rates on each link, strength and load on in network interferers, and strength and load on out of network interferers; and wherein the outputs can include a plurality of channel and bandwidth (BW) selection, routes and topology, Request to Send/Clear to Send (RTS/CTS) settings, Transmitter (TX) power, clear channel assessment, client association steering, band steering, Arbitration inter-frame spacing (AIFS), and Wi-Fi contention windows. The optimization can choose which access point each Wi-Fi client device connects to in the Wi-Fi system, and wherein the objective function maximizes excess capacity for a load ratio considering a load desired by each Wi-Fi client.

A load desired by each Wi-Fi client can be an input to the optimization, and the load can be determined by one or more of measured by the access points, estimated based on previous measurements, or unknown and set to an assumed value. The load desired by each Wi-Fi client can be set at a minimum reservation capacity. The optimization can be performed for the Wi-Fi system and one or more additional Wi-Fi systems which are clustered. The operational parameters can be set such that one or more of the following are true: not all of the access points are used, the Wi-Fi client devices do not necessarily associate with a closest access point, and backbone links utilize different channels. The outputs can define a topology of the access points in the Wi-Fi system in a tree structure. The outputs can define a topology in which at least one node has two or more parents and multi-path Transmission Control Protocol (TCP) is utilized for communication between the two or more parents. The optimization function can incorporate a cost for making changes to the operational parameters for the Wi-Fi system. The method can further include applying a hysteresis threshold to the output and performing the providing based on the hysteresis threshold.

In a further exemplary embodiment, a cloud controller for a Wi-Fi system configured to provide optimization includes a network interface communicatively coupled to the Wi-Fi system; one or more processors; and memory storing instructions that, when executed, cause the one or more processors to: receive inputs related to operation of the Wi-Fi system; perform an optimization based on the inputs to maximize an objective function which maximizes capacity; and provide outputs including operational parameters for the Wi-Fi system based on the optimization. The inputs can include a plurality of traffic load required by each Wi-Fi client device, signal strength for each possible link, data rate for each possible link, packet error rates on each link, strength and load on in network interferers, and strength and load on out of network interferers; and wherein the outputs can include a plurality of channel and bandwidth (BW) selection, routes and topology, Request to Send/Clear to Send (RTS/CTS) settings, Transmitter (TX) power, clear channel assessment, client association steering, band steering, Arbitration inter-frame spacing (AIFS), and Wi-Fi contention windows.

The optimization can choose which access point each Wi-Fi client device connects to in the Wi-Fi system, and wherein the objective function maximizes excess capacity for a load ratio considering a load desired by each Wi-Fi client. A load desired by each Wi-Fi client can be an input to the optimization, and the load can be determined by one or more of measured by the access points, estimated based on previous measurements, or unknown and set to an assumed value. The optimization can be performed for the Wi-Fi system and one or more additional Wi-Fi systems which are clustered. The operational parameters can be set such that one or more of the following are true: not all of the access points are used, the Wi-Fi client devices do not necessarily associate with a closest access point, and backbone links utilize different channels. The outputs can define a topology of the access points in the Wi-Fi system in a tree structure. The outputs can define a topology in which at least one node has two or more parents and multi-path Transmission Control Protocol (TCP) is utilized for communication between the two or more parents.

In a further exemplary embodiment, a Wi-Fi system configured for optimization by a cloud controller includes a plurality of access points communicatively coupled to one another and at least one access point communicatively coupled to a gateway providing external communication for the Wi-Fi system; and a cloud-based system configured to receive inputs related to operation of the Wi-Fi system; perform an optimization based on the inputs to maximize an objective function which maximizes excess capacity for a load ratio considering a load desired by each Wi-Fi client device; and provide outputs including operational parameters for the Wi-Fi system based on the optimization.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
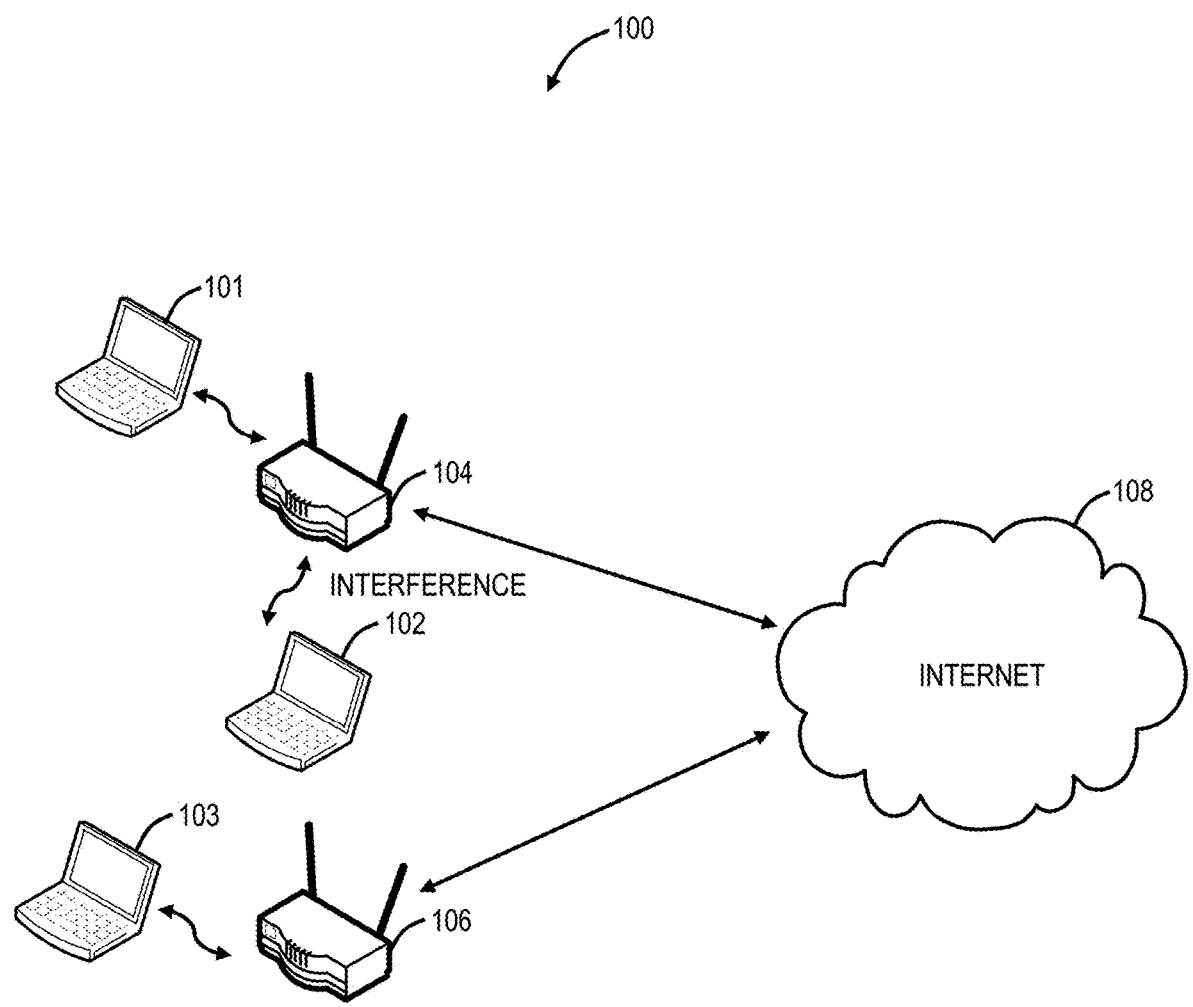
FIG. 1 is a network diagram of a Wi-Fi network, in which a Wi-Fi-enabled client may connect to any authorized Access Point (AP) when the client is within the AP's coverage area.

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

The optimization systems and methods receive inputs from the distributed Wi-Fi system, perform optimization, and provide outputs including operational parameters for the distributed Wi-Fi system. The inputs can include a plurality of traffic loads required by each Wi-Fi client device, signal strength and data rate for each possible link, packet error rates on each link, strength and load of in-network interferers, and strength and load of out of network interferers. The outputs can include a plurality of channel and bandwidth (BW) selection, routes and topology, Request to Send/Clear to Send (RTS/CTS) settings, Transmitter (TX) power, clear channel assessment, client association steering, band steering, QoS parameters including Enhanced Distributed Coordination Function (EDCF) priority and Arbitration Inter-Frame Spacing (AIFS), and Wi-Fi contention window settings. The optimization can be based on the inputs to maximize an objective function that can be defined in a wide variety of ways, to reflect real-world performance and usage preferences. In particular, an objective function that maximizes excess capacity for a load ratio considering a load desired by each Wi-Fi client device is beneficial. The optimization objective can also include a penalty for new topologies that would be disruptive to the operation of the Wi-Fi network to implement. The outputs of the optimizer can include operational parameters for the Wi-Fi system based on the optimization.

Wi-Fi Network

Wi-Fi networks are formed using one or more Wi-Fi Access Points (APs), which can be deployed in homes, apartments, office buildings, and as outdoor hotspots. Referring to FIG. 1, a network diagram illustrates a Wi-Fi network 100, in which a Wi-Fi-enabled client (101, 102, or 103) may connect to any authorized AP (104 or 106) when the client is within the AP's coverage area. Once a client is within the coverage area of a particular AP, the signal received by the client generally has a signal strength above the level required for connectivity to that AP. However, clients close to the AP typically receive stronger AP signals than clients farther away from the AP, and enjoy superior performance commensurate with the greater signal strength. APs are connected to the backbone Internet 108, with traffic routed to and from their clients via standard Internet protocols. When a client is within the coverage areas of multiple APs, the AP for the Wi-Fi connection is typically selected based on static client preferences (e.g., a preferred service set ID or SSID) or the best signal strength. For example, the client 102 in FIG. 1 is within the coverage areas of two APs (APs 104, 106), but the client 102 may connect to the AP 104 based on its preferred SSID. Wi-Fi APs operate in both the 2.4 GHz and 5 GHz spectral bands, with channel bandwidths of 20 MHz, 40 MHz, 80 MHz or 160 MHz, depending on the particular Wi-Fi standard used.

One way to reduce interference experienced by the clients 101, 102, 103 in a Wi-Fi network 100 is via channel allocation. FIG. 1 illustrates that clients 101, 102, 103 connected to a particular AP 104, 106 may experience interference caused by other APs 104, 106 within the Wi-Fi network 100. The wireless channels in a Wi-Fi network 100 are shared across all APs 104, 106 and their clients. When a given channel is used simultaneously by different APs 104, 106 with overlapping coverage areas, the APs 104, 106 create interference to each other's clients, as shown in FIG. 1. The amount of this interference depends on many factors, including the propagation conditions, the carrier frequency, and the distance between the interfering AP and the client. The channel allocation mechanism in IEEE 802.11 attempts to avoid such interference by assigning different channels to APs 104, 106 within close proximity to each other; this channel assignment may be done manually or based on local measurements. With this orthogonal frequency reuse, the APs 104, 106 use different frequencies and inter-AP interference is minimized. While this channel allocation works well to avoid interference in low-density AP deployments, in dense deployments there are not enough channels for this approach to be viable. For example, only three non-overlapping channels are available in the 2.4 GHz band, making it difficult, and at times impossible, for APs with overlapping coverage areas operating in this band to each be assigned a unique channel.

To mitigate co-channel interference between APs 104, 106 relatively close to each other that are operating on the same channel, a second interference mitigation mechanism—Carrier Sense Multiple Access with Collision Avoidance (CSMA/CA)—is used. CSMA/CA avoids simultaneous transmissions by two APs 104, 106 on the same channel by staggering the two APs' transmissions in time. Prior to transmitting a frame, an AP monitors the wireless channel for other Wi-Fi transmissions with received power exceeding a given Carrier Sense Threshold (CST). The CST defines a carrier sense radius around each transmitting device: any listening device within this radius will detect interference above the CST. The carrier sense radius as a function of azimuthal angle traces out a circle in ideal free-space propagation. In more typical operating environments, the radius as a function of azimuthal angle will have an irregular shape, due to the different shadowing and multipath experienced at different client locations. A random back-off timer-based mechanism ensures that listening devices that detect the channel as occupied will not all simultaneously attempt to transmit as soon as the channel becomes unoccupied.

Figure 2A:
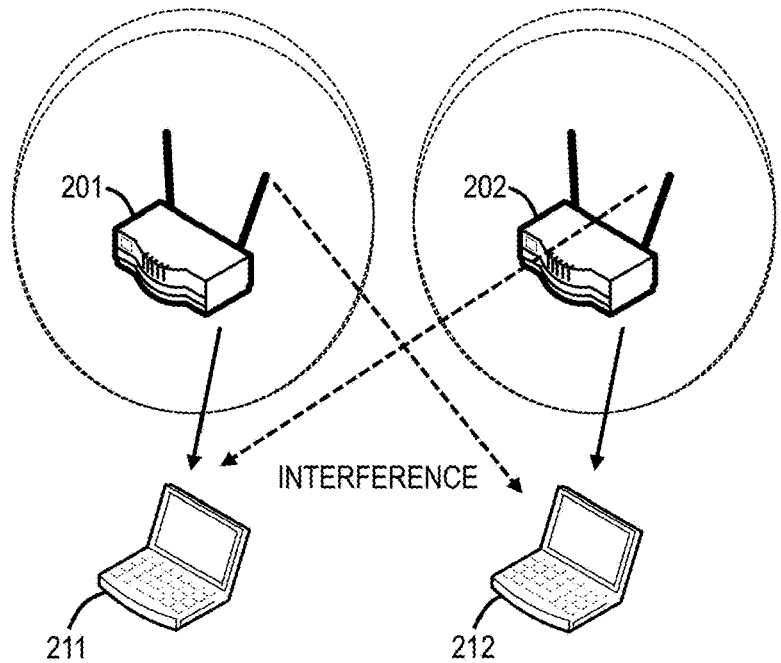
FIG. 2A is a diagram illustrating that when the carrier sense threshold (CST) is high, the carrier sense radius is small.
Figure 2B:
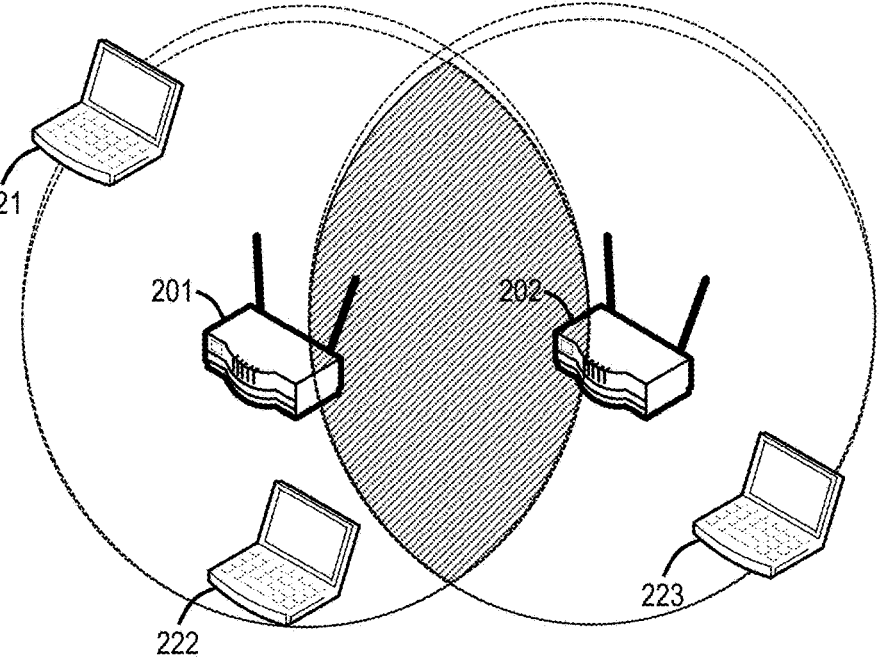
FIG. 2B is a diagram illustrating that when the CST is low, the carrier sense radius is large.

Carrier sensing generally works well in low-density deployments of APs, where there are sufficient channels to avoid interference between APs, and hence aggressive frequency reuse is not needed. However, in dense deployments, with neighboring APs using the same channel, carrier sensing induces a tradeoff between aggressive frequency reuse and higher levels of interference, as illustrated in FIGS. 2A and 2B. In FIG. 2A, when the CST is high, the carrier sense radius is small. Hence AP 201 and AP 202 will transmit simultaneously, causing interference to the other AP's client. If this interference does not preclude successful packet reception, then throughput is high; if the interference is sufficiently high so as to cause packet errors, then these packets need to be retransmitted, thereby reducing throughput and increasing delay. In FIG. 2B, when the CST is low, the carrier sense radius is large. This will preclude AP 201 and AP 202 from transmitting simultaneously. If both APs have data to transmit, one will back off, thereby reducing its throughput and increasing delay.

Current Wi-Fi networks use a static CST that can be AP-specific. Selecting static CST rarely optimizes network performance, since whether or not two neighboring APs A and B transmit simultaneously depends on whether the power received from AP A at AP B (and vice versa) is below the threshold. This is not the best criterion to use: in particular, packet errors are caused not by the interference between neighboring APs, but are caused by the interference between a given AP and the client associated with the neighboring AP. As shown in FIG. 2B, with a low CST, the APs 201, 202 fall within each other's carrier sense radius and hence will never transmit simultaneously. However, since a client 221 is far from the AP 202, and a client 223 is far from the AP 201, a transmission from the AP 201 to the client 221 could occur simultaneously with a transmission from the AP 202 to the client 223 with minimal interference between them. Fundamentally, whether the AP 202 should transmit when the AP 201 is transmitting should depend on how that interference impacts the signal received by the AP 201's client, i.e., it should depend on the signal-to-interference-plus-noise (SINR) at the AP 201's client. In addition to adapting to SINR, CSTs should also adapt to the AP density, as more APs are added to the network, as well as adapt to the client data requirements and changing propagation conditions of APs sharing the same channel. Setting the threshold adaptively can both increased throughput and reduce packet error probability.

Figure 3:
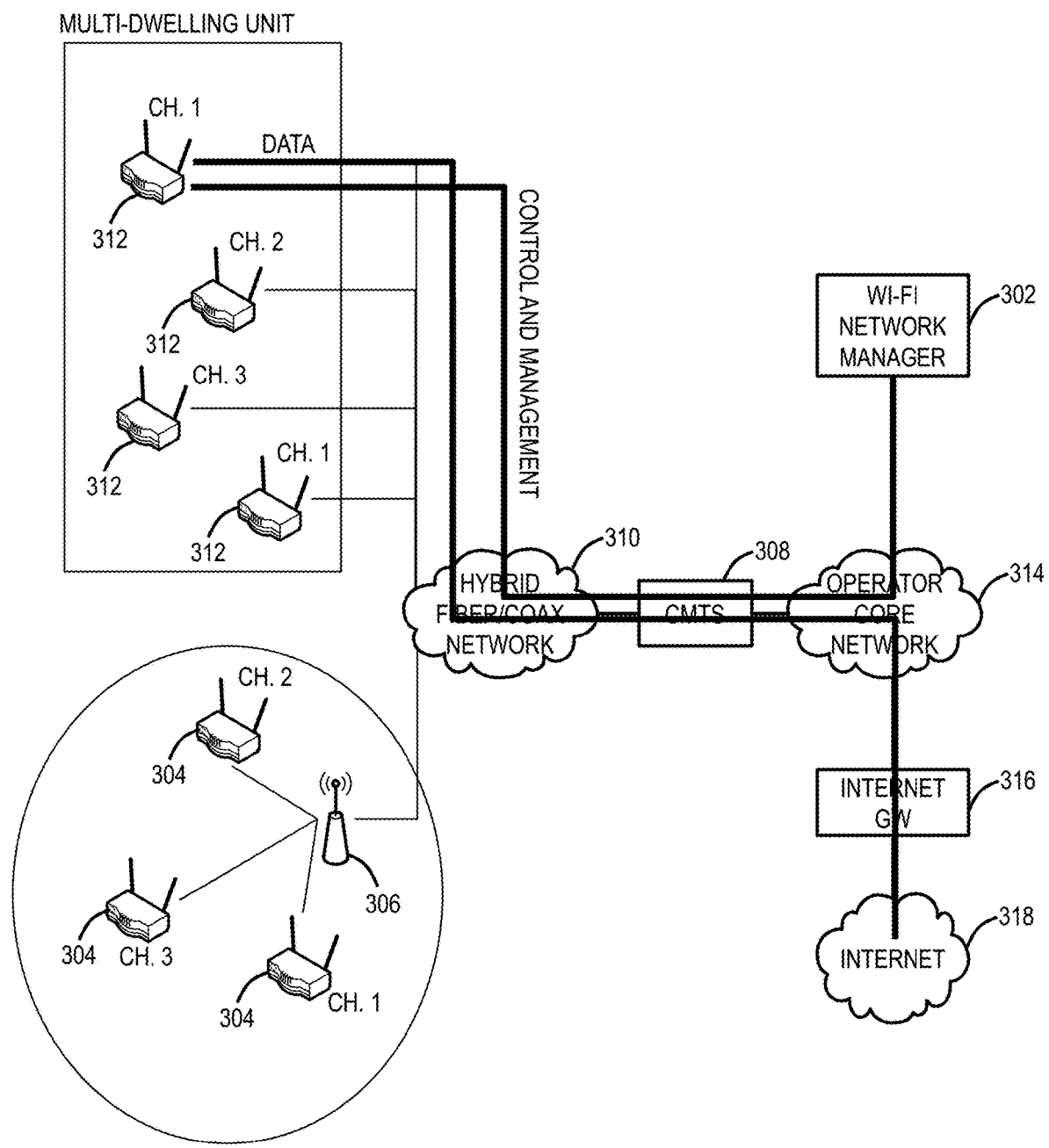
FIG. 3 is a network diagram of an embodiment of a Wi-Fi-network manager for automatically and dynamically configuring and updating Wi-Fi AP parameters in one or more Wi-Fi networks to optimize the overall network performance of the one or more Wi-Fi networks.

FIG. 3 illustrates an embodiment of a Wi-Fi-network manager 302 for automatically and dynamically configuring and updating Wi-Fi AP parameters in one or more Wi-Fi networks to optimize the overall network performance of the one or more Wi-Fi networks. In some embodiments, the Wi-Fi network manager 302 connects to the APs and provides service to the APs as a server. In some embodiments, Wi-Fi network manager 302 manages tens of thousands (or more) of APs within the one or more Wi-Fi networks.

FIG. 3 illustrates one exemplary embodiment in which the APs are connected to the Wi-Fi network manager 302 and the Internet 318 using cable modems. Note that FIG. 3 is provided as an illustrative example only. Therefore, the present application is not limited to this specific example. For example, the APs managed by Wi-Fi network manager 302 may be connected to the Wi-Fi network manager 302 using network technologies other than cable modem technologies, including Digital Subscriber Line (DSL) technologies and other Internet technologies.

As shown in FIG. 3, some of the APs managed by the Wi-Fi network manager 302 may be standalone Wi-Fi APs 304. Alternatively, some of the Wi-Fi APs may be embedded into other devices, such as cable modems, DSL modems, and the like. Standalone Wi-Fi APs 304 may be connected to a cable modem 306, and cable modem 306 may be connected to a cable modem termination system (CMTS) 308 via a hybrid fiber-coaxial (HFC) network 310. The CMTS 308 may be further connected to the Wi-Fi network manager 302 via an operator core network 314. Data packets that are sent from the CMTS 308 to the Internet 318 are routed through an Internet Gateway 316. Some APs 312 managed by the Wi-Fi network manager 302 may be integrated units, each integrating a cable modem and a Wi-Fi AP as a single unit. The integrated units 312 may be connected to CMTS 308 via HFC network 310.

In some embodiments, a software agent is installed on the APs. For example, a piece of software may be installed on an AP by an end-user or a network administrator. In another example, an application may be downloaded from a website, and the application acts as an agent between the AP and the Wi-Fi network manager 302. The Wi-Fi network manager 302 may manage and configure the parameters of an AP using different protocols, including Simple Network Management Protocol (SNMP), Control And Provisioning of Wireless Access Points (CAPWAP), Technical Report 069/181 (TR-069/TR-181), Command-Line Interface (CLI), Extensible Markup Language (XML), and the like.

Figure 4:
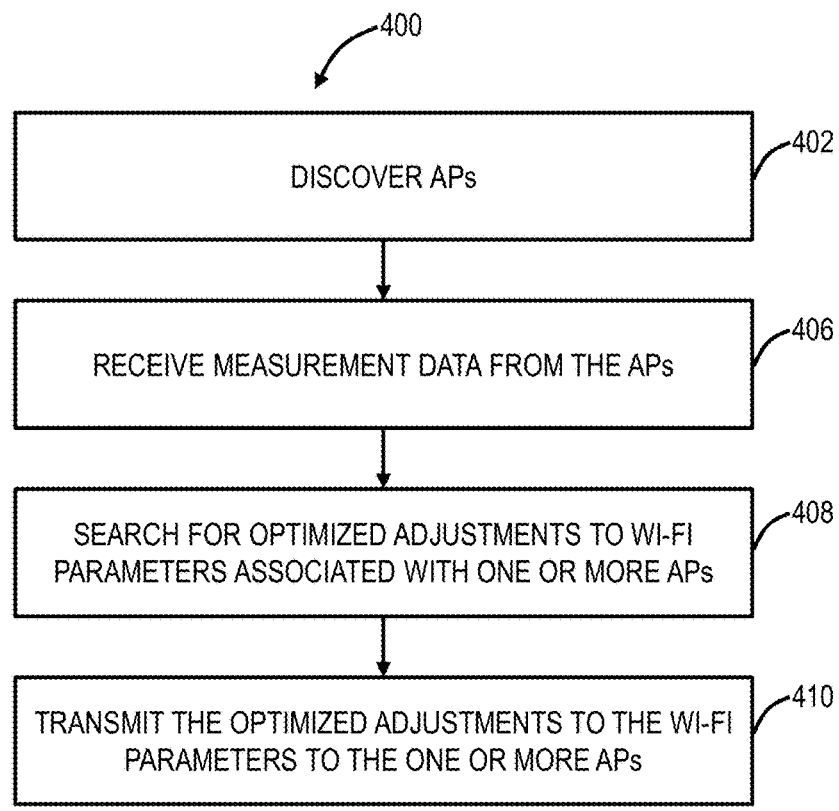
FIG. 4 is a flowchart illustrating an embodiment of a process for automatically and dynamically configuring and updating Wi-Fi AP parameters in one or more Wi-Fi networks to optimize the overall network performance.

FIG. 4 is a flowchart illustrating an embodiment of a process 400 for automatically and dynamically configuring and updating Wi-Fi AP parameters in one or more Wi-Fi networks to optimize the overall network performance. In some embodiments, process 400 is a process that runs on the Wi-Fi network manager 302 in FIG. 3.

At 402, the APs that are installed in the Wi-Fi networks managed by the Wi-Fi network manager 302 are discovered. The Wi-Fi network manager 302 is configured to manage a heterogeneous group of APs. The APs may support different Wi-Fi protocols, including 802.11a, 802.11c, 802.11g, 802.11n, 802.11ac, and the like. The APs can be made by different third-party vendors. Some of the APs may be purchased off-the-shelf. Therefore, the APs that are managed by the Wi-Fi network manager 302 have a wide range of capabilities, configurable parameters, and interfaces. The Wi-Fi network manager 302 discovers the APs within the Wi-Fi networks, including their capabilities, configurable parameters, interfaces, and the like. This information may be used by the Wi-Fi network manager 302 to more optimally search for a set of configurable parameters for any AP managed by the Wi-Fi network manager 302 to achieve improved overall network performance. For example, a search algorithm that is run by the Wi-Fi network manager 302 may take into consideration that a particular parameter is not configurable on a particular AP to reduce the search complexity by either searching over a smaller set of configurable parameters or simplifying the search based on a partition of the APs based on their configurability.

At 406, measurement data is received from the APs. The measurement data is locally collected by the APs and then sent to the Wi-Fi network manager 302. The measurement data collected by an AP may include data regarding the AP's clients and data regarding clients connected to neighboring APs. The measurement data may include Receive Signal Strength Indication (RSSI), Channel Quality Index (CQI), throughput, packet error rate, and the like. RSSI is a measurement of the power present in a received radio signal. CQI is a measurement of the communication quality of wireless channels. In some embodiments, the measurement data is Wi-Fi standard-based measurement data (e.g., IEEE 802.11 standard-based measurement data) measured by the APs. In some embodiments, the APs may collect additional measurement data that is optional or not specified in the 802.11 standards.

At 408, adjustments to Wi-Fi parameters associated with one or more APs to optimize the Wi-Fi overall network performance are searched. As the Wi-Fi network manager 302 receives measurement data from many APs, including APs installed in multiple Wi-Fi networks, the measurement data may be used by the Wi-Fi network manager 302 to compute Wi-Fi parameters that can optimize network performance in a global sense, achieving superior network performance.

The Wi-Fi overall network performance may be defined by different metrics. In some embodiments, the metrics may be a set of network optimization goals defined by a network operator. The goals may include increasing the average network throughput, increasing the geometric mean throughput, reducing interference, reducing outage probability, increasing coverage, improving fairness, supporting specific quality-of-service metrics for high-priority traffic, and the like.

Different Wi-Fi parameters may be dynamically adjusted to optimize the Wi-Fi overall network performance. As will be described in greater detail below, Wi-Fi parameters that can be dynamically and optimally adjusted may include CSTs, channel allocation, transmit power, Multiple-Input Multiple-Output (MIMO) antenna parameters, backoff parameters, and the like.

Different optimization techniques may be employed by the Wi-Fi network manager 302 for searching the optimized Wi-Fi parameters. In some embodiments, the network optimization goals are evaluated based at least in part on the measurement data received from the APs. For example, an aggregate network throughput may be computed based on throughput measurement data received from the APs. The set of network optimization goals may be represented by an objective function or a cost function in an optimization problem. An optimized Wi-Fi parameter resulting from the search is a feasible solution or optimal solution that minimizes (or maximizes) the objective function subject to different constraints. Since multiple types of Wi-Fi parameters may be adjusted simultaneously during a search, different techniques to combat interference, increase throughput, or maximize coverage may be leveraged at the same time. For example, instead of determining channel allocation and CST individually or locally, they can be optimized simultaneously in a global sense. Some constraints may be requirement constraints that are configurable by the network operator. For example, one requirement constraint may impose a minimum percentage of AP clients in the Wi-Fi networks with a throughput above a certain threshold.

With continued reference to FIG. 4, at 410, at least some of the optimized adjustments to the one or more Wi-Fi parameters are transmitted to the one or more APs. The received adjustments may be used by the APs for self-configuration, self-optimization, and self-healing, such that the APs can collectively form a self-organizing network.

The received adjustments may be used to initialize an AP that has been recently installed. For example, after an AP is first installed, the AP collects initial measurement data and sends the data to the Wi-Fi network manager 302. The Wi-Fi network manager 302 then computes the parameters for AP and sends them to the AP for self-configuration.

The received adjustments may be used to re-configure an existing AP. When the existing AP connects to the Wi-Fi network manager 302 for the first time, the existing AP is treated as a new installation for the purpose of network optimization. The Wi-Fi network manager 302 computes new parameters for the existing AP based on the received measurement data from the existing AP and other APs, and the Wi-Fi network manager 302 sends the new parameters to the existing AP for reconfiguration.

The received adjustments may also be used to periodically update the Wi-Fi parameters of an existing AP. These adjustments are computed based on dynamic, real-time measurements made periodically by the APs.

The received adjustments may also be used by the APs for self-healing any network topology changes. For example, a network topology change may be caused by the failure of an AP. The Wi-Fi network manager 302 detects the failure, and the parameters of the surrounding APs are automatically adjusted to fill in the resulting coverage hole. In another example, a network topology change may be caused by new APs being installed on a Wi-Fi network. The network topology change may be detected by Wi-Fi network manager 302, which is triggered by the detection to initiate a new search.

Figure 5:
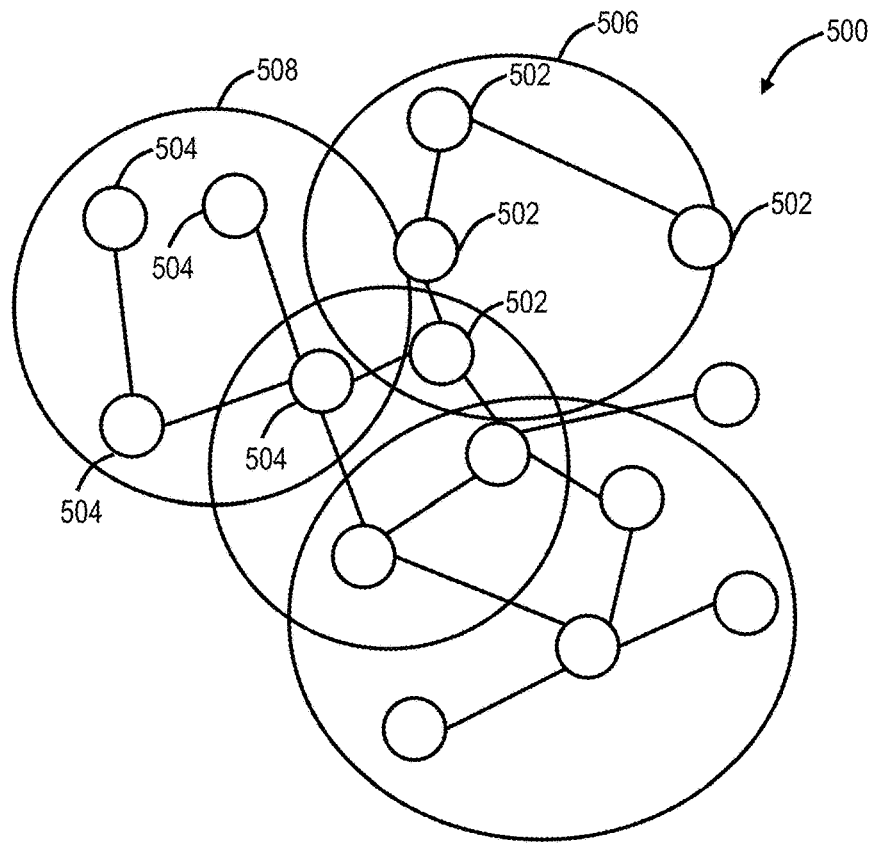
FIG. 5 is a network diagram illustrating that APs may be divided into a plurality of local neighborhoods for local optimization.

In some embodiments, the search performed by the Wi-Fi network manager 302 may create local neighborhoods for local optimization in addition to global optimization. FIG. 5 illustrates that APs in a network 500 may be divided into a plurality of local neighborhoods for local optimization. As shown in FIG. 5, APs 502 within a localized region 506 are grouped together for local optimization. Similarly, APs 504 within another localized region 508 are grouped together for local optimization. A local optimization may be performed prior to a global optimization across the entire network. The local optimization has a lower computational complexity, and it avoids changing parameters across the entire network at the same time. The global optimization avoids local minima that may arise when only local parameters within a neighborhood are accounted for in the local optimization.

Figure 6:
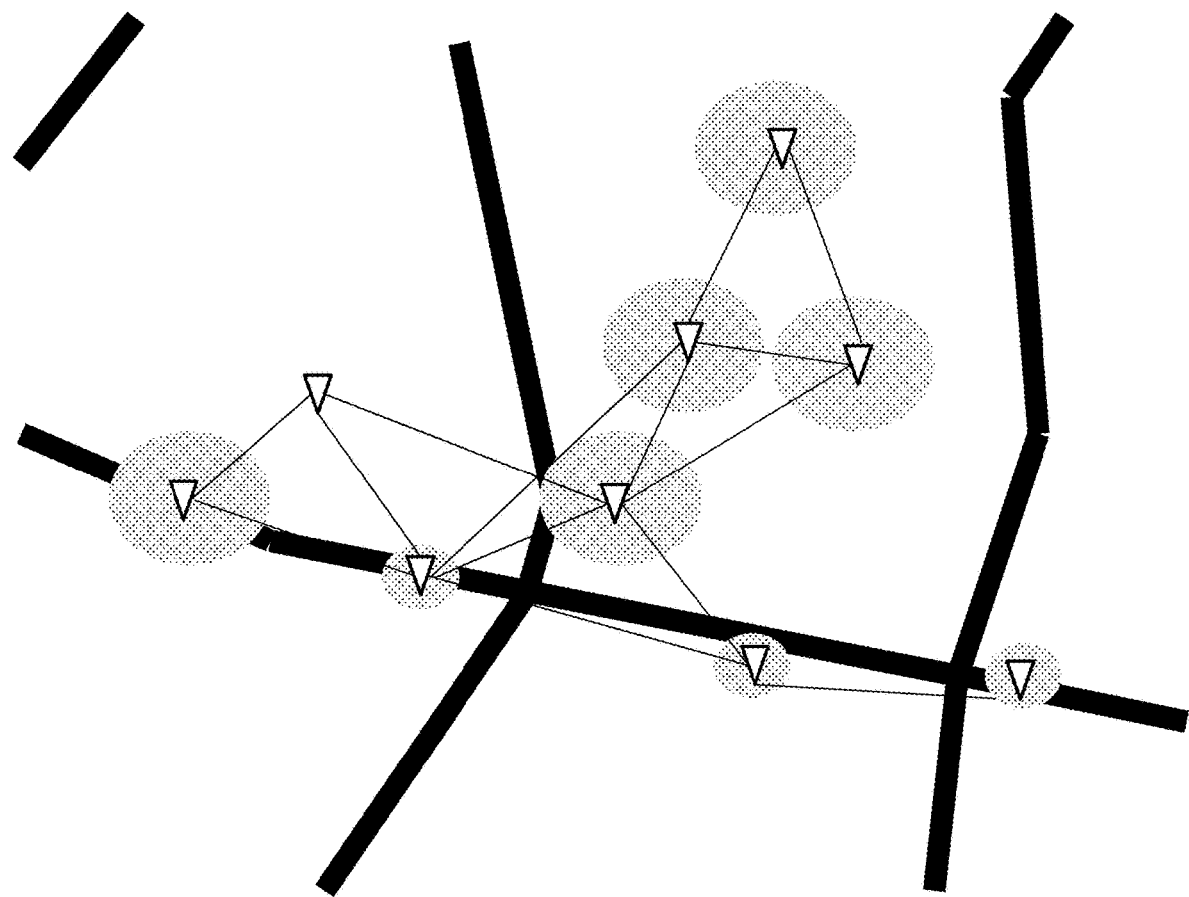
FIG. 6 is a throughput map illustrating the throughput available at different locations throughout the Wi-Fi network.

The AP coordination enabled by the Wi-Fi network manager 302 provides additional functionality beyond the optimization of AP configuration, including load balancing, power control, coordinated scheduling, cross-layer optimization, seamless handovers, and the like. The Wi-Fi network manager 302 can perform load balancing by moving a client connected to a heavily congested AP to a nearby AP that is less congested. The Wi-Fi network manager 302 can also enable seamless session handoff between APs, such that mobile users experience no disruption in a streaming application, such as video. The Wi-Fi network manager 302 can provide throughput maps showing the throughput available at different locations throughout the Wi-Fi network, as shown in FIG. 6. These maps are generated based on throughput calculations taking into account the RSSI and interference estimates, the measured throughputs of clients and their estimated locations, and the measured noise floor at each AP. Throughput maps identify coverage holes in the network. Moreover, they can also be used to optimize new AP deployments by determining which of several possible locations provides the largest improvement in network throughput and coverage.

Wi-Fi APs operate in the 2.4 GHz and 5 GHz bands. These bands have three and thirteen non-overlapping channels of 20 MHz, respectively. The 802.11a/g standard allows only one 20 MHz channel to be assigned to an AP and its clients, while the 802.11n and 802.11ac standards allow up to two 20 MHz and up to four 40 MHz channels, respectively, to be assigned to each AP. When more than one channel is assigned to an AP, there is the notion of a primary channel and secondary channels. The primary channel is used by an AP to communicate with devices that are restricted to the bandwidth associated with the channel. The secondary channels are used by an AP to communicate with devices that support bandwidths larger than that of the primary channel. For example, in 802.11n, two 20 MHz channels, a primary and a secondary channel, are bonded together to form a 40 MHz channel, but only the primary channel is used for communication with 802.11a/g devices as the latter only support 20 MHz channels. All packet transmissions between an AP and its clients occur either over only the primary channel or over the primary channel as well as one or more secondary channels. The AP generally prioritizes the use of its primary channel in its transmissions. Conversely, the secondary channels can only be used if the interference caused by the AP on this channel is below the CST of neighboring APs on their primary channel. Channel assignment in 802.11 entails assigning each AP a primary channel and one or more secondary channels.

The primary and secondary channel assignments are examples of Wi-Fi AP parameters that can be adjusted dynamically and automatically to optimize the overall network performance based on a set of network optimization goals. The primary and secondary channel assignments are chosen, optimally or sub-optimally, based on the set of network optimization goals. The primary and secondary channel assignments and other types of Wi-Fi parameters may be adjusted simultaneously during a search. However, in some cases, an optimal adjustment may not be available, and the Wi-Fi network manager 302 optimizes the APs' channel assignment as follows:

1. Each AP is typically assigned the maximum bandwidth it can support: 20 MHz for 802.11a/g APs, 40 MHz for 802.11n APs, and 160 MHz for 802.11ac APs. This increases the likelihood that the clients associated with each AP can be served at the highest data rates possible. In some cases, assigning the maximum bandwidth that the AP can support is not the optimum solution in increasing network performance; in such cases, a smaller bandwidth is assigned to that AP.
2. The primary channel assignment scheme is such that the closest APs are assigned non-overlapping primary channels. This minimizes contention when all the APs use only primary channels.
3. Secondary channels (if applicable) are assigned to the APs to minimize interference on the primary channels.
4. Channels are assigned to minimize interference from APs not under the control of the Wi-Fi network manager 302.
5. Channel assignments are periodically re-optimized as the load in each basic service set (BSS) and the associations of clients to a BSS (e.g., due to mobility or load balancing) change over time.

Figure 7:
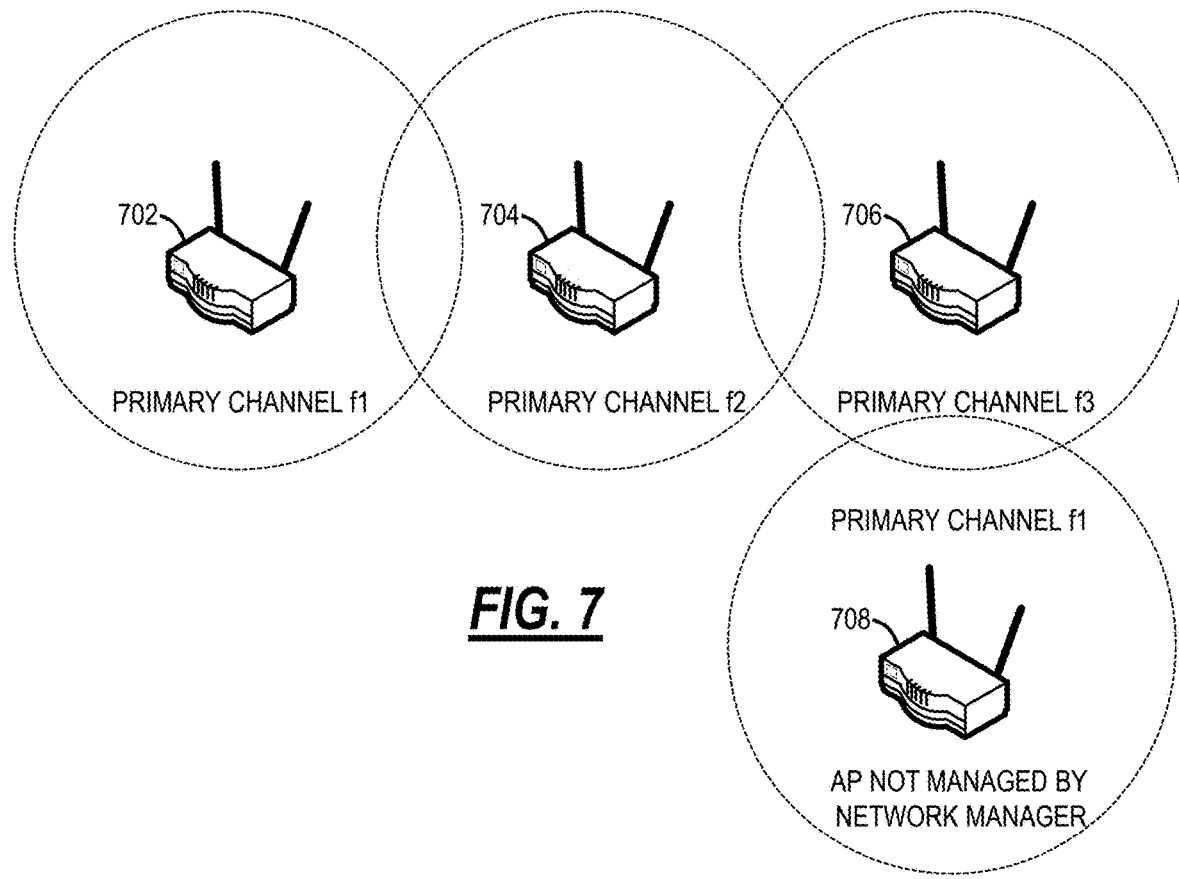
FIG. 7 is a diagram of an embodiment in which primary channels are assigned such that APs with their primary channels on the same frequency channel are farthest apart.

In some embodiments, the Wi-Fi network manager 302 optimizes the assignment of primary channels of APs such that APs with their primary channels on the same frequency channel, whether controlled by the Wi-Fi network manager 302 or not, are farthest apart. FIG. 7 illustrates an embodiment in which primary channels are assigned such that APs with their primary channels on the same frequency channel are farthest apart. APs 702, 704, and 706 are managed by the Wi-Fi network manager 302, while AP 708 is not. The primary channels for the AP 702, AP 704, and AP 706 are assigned different frequency channels, whereas the primary channel of the AP 708 is assigned the same frequency channel as the AP farthest away, i.e., the primary channel of AP 702. In some embodiments, simple models for interference are used for optimizing the assignment of the primary channels as described above. In some embodiments, low-complexity computational techniques for approximately solving a combinatorial optimization problem are used for optimizing the assignment of the primary channels as described above. These techniques include belief propagation, convex optimization, and genetic mutation.

Figure 8:
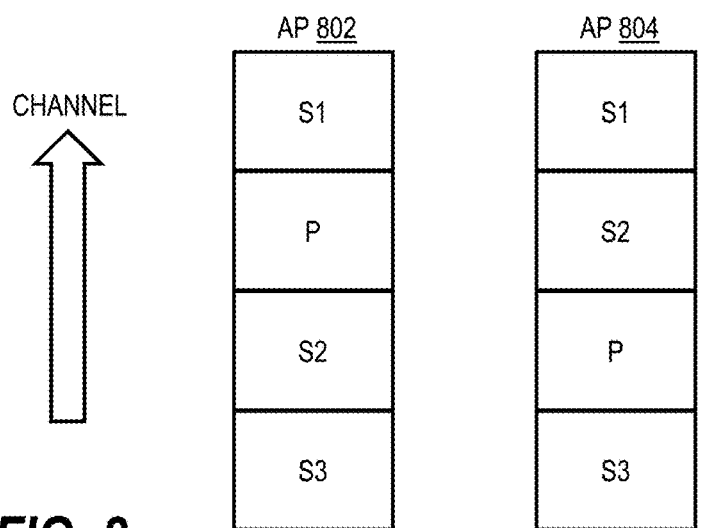
FIG. 8 is a diagram illustrating that neighboring APs have non-overlapping primary channels (denoted by P), while the secondary channel S2 of each AP overlaps with the primary channel of the other AP.

Given the assignment of primary channels, secondary channels (if applicable) are assigned to the APs to minimize interference on primary channels. However, since the number of channels available is limited and the Wi-Fi network manager 302 first assigns the maximum bandwidth to each AP, an AP's primary channel may overlap with a neighboring AP's secondary channels, as shown in FIG. 8. As indicated in FIG. 8, neighboring APs have non-overlapping primary channels (denoted by P), while the secondary channel S2 of each AP overlaps with the primary channel of the other AP. In addition, secondary channel S1 (or S3) of the AP 802 overlaps with secondary channel S1 (or S3) of the AP 804. Based on the IEEE 802.11 standard, the AP 802 can transmit at its maximum power on its primary channel, and will often do so to clients located on the edge of its coverage area. Without dynamic configuration of the CST (i.e., if the CST is set statically), the CST is typically set at a level such that the AP 804 cannot reuse this channel (which is a secondary channel for the AP 804) for transmission when the AP 802 transmits at maximum power. For clients well in the interior of its coverage region, the AP 802 will typically transmit at a lower power on its primary channel and one or more of its secondary channels. If the CST is set statically, it is typically set at a level such that the AP 804 can reuse these channels when the AP 802 transmits at this lower power level. Thus, this results in fractional frequency reuse. As will be described in greater detail below, dynamic adaptation of the CST and dynamic adaptation of power can provide additional degrees of freedom for optimization, resulting in further improved performance.

The transmit power levels of the APs are examples of Wi-Fi AP parameters that can be adjusted dynamically and automatically to optimize the overall network performance based on a set of network optimization goals. The Wi-Fi network manager 302 also tunes the individual transmit power at APs based on their radio measurements. The transmit power at each AP is selected, optimally or suboptimally, based on the network optimization goals. For example, reducing transmit power at a given AP reduces interference between the given AP and other devices on the same channel. However, this also reduces SNR and RSSI between the AP and its connected devices. Thus, power control optimizes this tradeoff. As another example, CST values can be taken into account while setting the transmit power of an AP. In particular, the transmit power of a given AP can be set such that neighboring APs only back off when their interference to at least one client of the given AP is above a given threshold. This form of power control is especially useful when an AP is serving clients experiencing relatively good channel quality, and hence interference from neighboring APs would not create significant degradation. In addition, the Wi-Fi network manager 302 detects coverage holes via the RF coverage maps as discussed below. Upon detection of a coverage hole, the Wi-Fi network manager 302 increases the transmit power of APs in the vicinity of the coverage hole up to the maximum level to fill in the hole. As another example, transmit power control can be jointly optimized with primary and secondary channel allocation to improve the network optimization.

In some embodiments, the Wi-Fi network manager 302 dynamically adapts the CSTs of the APs. In dense Wi-Fi deployments, if the CST is low, the coverage area of the AP is typically much smaller than its carrier sense radius. As a result, an AP would sense the medium and avoid transmitting to its client, even when the client is far from the interfering AP (e.g., see Client 223 of FIG. 2B) and is thus capable of receiving the transmission from the AP. On the other hand, if the CST is high, a number of transmitters access the same channel simultaneously, creating higher interference, as shown in FIG. 2A. Therefore, the CST value on APs should be set dynamically based on client locations, propagation conditions, load, and network topology.

In some embodiments, the Wi-Fi network manager 302 dynamically adjusts the CST to systematically create periods of high reuse and low reuse. During the high reuse periods, the CST is high, so neighboring APs on the same channel will typically transmit packets simultaneously, leading to high data rates but potentially higher packet loss due to interference. Conversely, during periods of low reuse, neighboring APs transmit at different times in order to protect the weaker links, thereby preventing their outage. This can be achieved by using different CST values during different periods. Specifically, high CST values are used during high reuse periods, while low CST values are used during low reuse periods. The CST values and the division of time between the high and low reuse phases are optimized based on the channel and load measurements. In some embodiments, larger channel bandwidths are assigned to the APs to provide more flexibility to the neighboring APs in reusing the channel in time.

Figure 9:
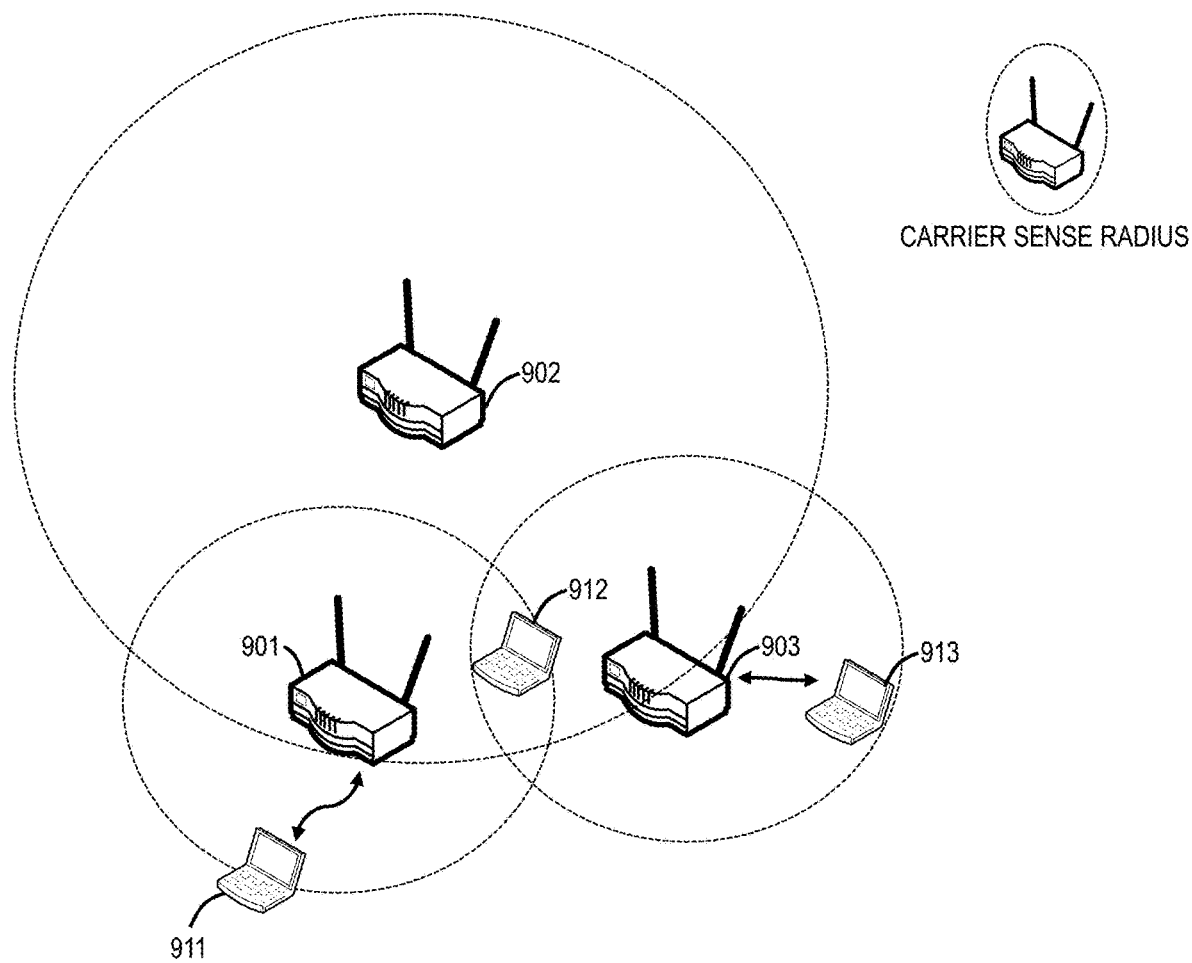
FIG. 9 is a network diagram of time intervals in which an APs is configured with a low CST while other APs are configured with high CST values.
Figure 10:
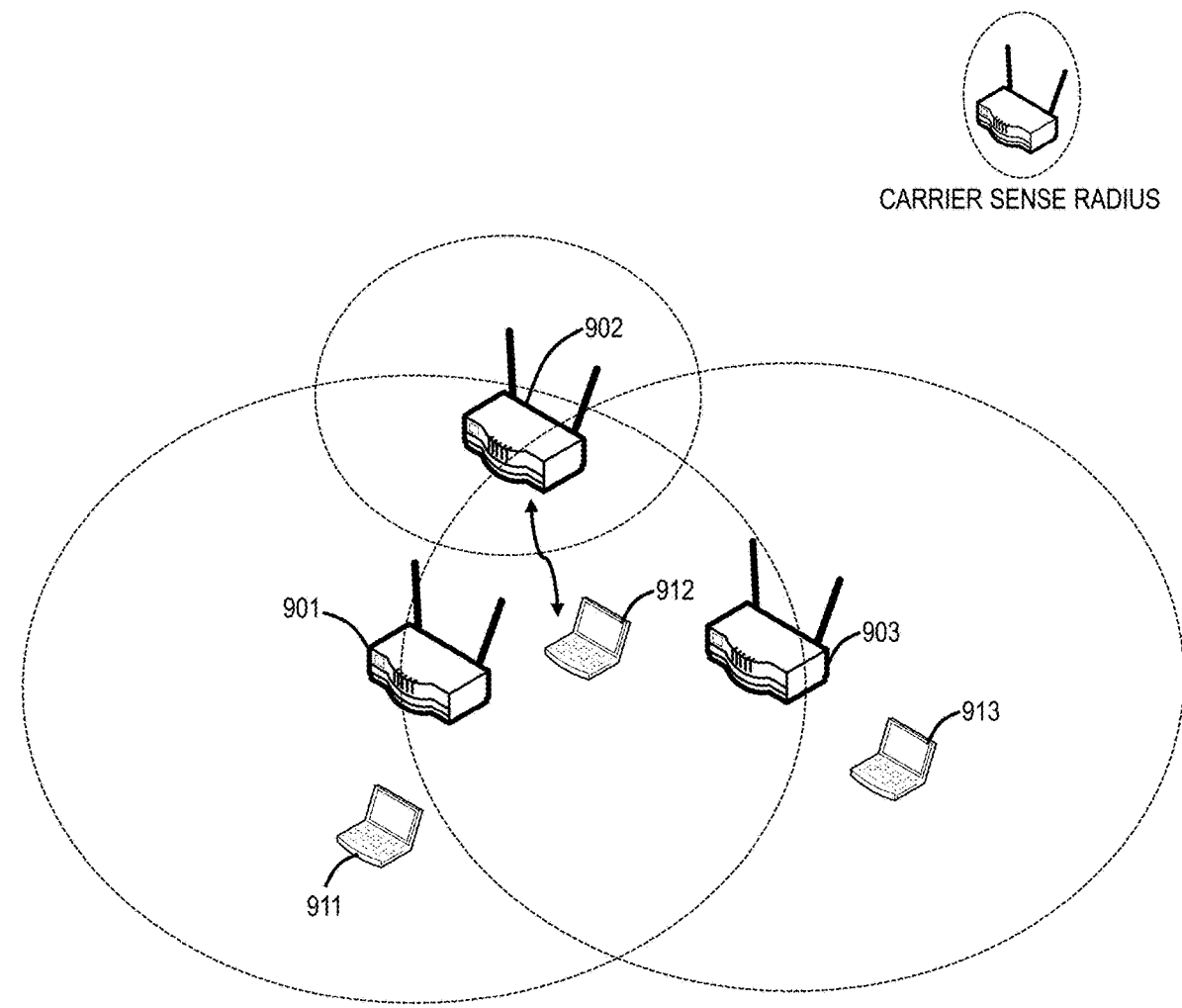
FIG. 10 is a network diagram where an AP is configured with a high CST, while other APs are configured with low CST values, different from FIG. 9.

FIG. 9 and FIG. 10 illustrate the high and low reuse periods of APs assigned to the same channel. FIG. 9 shows time intervals in which AP 902 is configured with a low CST while AP 901 and AP 903 are configured with high CST values. During such intervals, AP 902 remains silent, whereas AP 901 and AP 903 transmit to client 911 and client 913 simultaneously. This ensures that the network obtains high-frequency reuse (increased overall throughput) without outages over individual links.

While the CST settings of FIG. 9 provide aggressive reuse for AP 901 and AP 903, AP 902 is precluded from transmitting. Thus, during other time intervals, as shown in FIG. 10, the dynamic CST would configure AP 902 with a high CST, while AP 901 and AP 903 are configured with low CST values. During such intervals, when AP 902 transmits to client 912, AP 901 and AP 903 backs off from transmitting (upon sensing AP 902's transmissions), thereby ensuring client 912 is protected from the potential interference. This ensures that the network can guarantee that all clients obtain satisfactory user experience. This dynamic CST optimization scheme may be coupled with dynamic channel assignment (discussed earlier) to jointly optimize the channel allocation and frequency reuse for each channel. This dynamic CST optimization scheme may be coupled with dynamic channel allocation (discussed earlier) to jointly optimize channel allocation and transmit power for each channel. Dynamic CST, power control, and channel allocation may also be jointly optimized.

In some embodiments, the Wi-Fi network manager 302 dynamically optimizes the MIMO parameters of the APs. By introducing standards-based support for multiple antennas, the IEEE 802.11n and 802.11ac standards provide additional spatial dimensions for optimization. This flexibility allows for higher data rates and improved link reliability within the same bandwidth. In particular, compared to single antenna transmission/reception, MIMO schemes provide a three-fold advantage in terms of increased data throughput (spatial multiplexing), increased link reliability (transmit diversity), and array gain (spatial beamforming).

The IEEE 802.11n and 802.11ac standards support up to 4 and 8 transmit and receive antennas, respectively, with an equal number of maximum spatial streams. The IEEE 802.11n/ac standards provide support for achieving the aforementioned advantages via spatial precoding and beamforming schemes. The peak rate achieved in IEEE 802.11n is 600 Mbps while that in IEEE 802.11ac is more than 1 Gbps. In addition, the IEEE 802.11ac standard supports Multi-User MIMO (MU-MIMO), wherein multiple clients, each equipped with one or more antennas, can simultaneously transmit/receive within the same frequency channel.

In some embodiments, the Wi-Fi network manager 302 optimizes MIMO transmission parameters as follows:
1. Transmission Selection between Spatial Multiplexing and Diversity: There is a tradeoff between maximizing the data rate (via transmitting multiple spatial streams) and providing adequate link reliability in the presence of fading and multipath propagation (via diversity) for each spatial stream. This paradigm is referred to as the Diversity-Multiplexing (DM) tradeoff. In some embodiments, the Wi-Fi network manager 302 optimizes the transmission scheme, by exploiting the DM tradeoff, depending on the radio link conditions between each AP to its client.
2. Beamforming: Beamforming at the AP provides an increased signal-to-noise ratio (SNR) at a client; alternatively, given knowledge of the channel statistics, the solution can minimize interference to clients connected to neighboring APs on the same channel.
3. Switching between Single-User and Multi-User MIMO: In high geometry and sufficiently uncorrelated scenarios, the solution will enable APs to spatially precode and transmit to multiple clients, provided their spatial signatures are sufficiently resolvable at the client.

The Wi-Fi network manager 302 utilizes measurements performed by the APs to measure the channels to its clients as well as clients associated with neighboring APs operating on the same frequencies. The channels are estimated on the basis of sounding packets transmitted by clients. The measurements are fed back to the Wi-Fi network manager 302, which optimizes the MIMO parameters at the APs via standardized interfaces, as discussed above.

In some embodiments, the Wi-Fi network manager 302 dynamically adapts the load balancing of the APs. Load balancing dynamically updates the association of clients based on the loads at different APs. For example, if an AP is highly loaded, the Wi-Fi network manager 302 can avoid overloading this AP by a client on the boundary of the AP's coverage area to connect to a neighboring AP with a low load, even if the channel quality of the client to the neighboring AP is not as good. This load balancing can result in performance improvement for this client, as well as the other clients connected to the original AP. After offloading a client from one AP to a less-loaded AP, the Wi-Fi network manager 302 then re-optimizes the channel allocations and transmit powers of the affected APs to account for this change in load.

In some embodiments, the Wi-Fi network manager 302 dynamically coordinates the scheduling of the APs. The Wi-Fi network manager 302 enables backhaul-coordinated scheduling whereby the APs managed by the network manager access the medium in a contention-free manner by transmitting beacon frames and a NAV-based reservation (within the beacon frames) of the medium. This notion of centralized scheduling and beacon-based access is akin to the concept of almost-blank subframes discussed earlier. Within the contention-free period, the resource allocation (e.g., the number of transmission opportunities at individual APs) within the contention-free period can be determined by the Wi-Fi network manager 302 based on different parameters, such as, for example, the queue lengths of different traffic classes at individual APs. Between time intervals with contention-free access, the dynamic configuration technique will implement periods of contention-based access in order to ensure that APs that are not managed by the Wi-Fi network manager 302 can access the medium.

In some embodiments, the Wi-Fi network manager 302 enables Cross-Layer Optimization for Adaptive Video Streaming. One of the key challenges in adaptive video streaming over Hypertext Transfer Protocol (HTTP) over Transmission Control Protocol (TCP) is to adapt the video quality to the end-to-end bandwidth available between the server and the client. If a Wi-Fi network is used as the last hop to deliver streaming video to the client, the bandwidth is often limited by the wireless bandwidth available between the client and the AP it connects to. In some embodiments, Application Programming Interfaces (APIs) are used between the Media Access Control (MAC) layer and the application layer to achieve the following:
1. Estimates of data rates that can be offered in the future, for example on a timescale of tens of seconds, can be provided to the application layer. This can help the application layer better adapt the video quality. Current solutions can be either too aggressive or too slow to react to bandwidth variation.
2. Admission control and rate guarantees may be performed for the different video streaming flows so that the desired quality of video can be viewed by the users. User differentiation can also be provided.

In some embodiments, the Wi-Fi network manager 302 enables seamless Handoffs. In Wi-Fi networks, APs with the same SSID are called an Extended Service Set—clients transparently connect to any AP in this set without differentiation. The Wi-Fi network manager 302 configures the Extended Service Set (ESS) for APs within a hotspot to ensure client mobility within the service area. Existing management interfaces are used to configure APs in this set, without requiring changes to the AP's software.

Advanced handoff functionality may be supported when a software agent is integrated with the APs. Inter-AP coordination for seamless handoffs within an ESS can be provided. The software agent adds Proxy Mobile IP functionality to the AP, enabling client handover across ESSs. This is a network-initiated procedure and there is no dependency on the client.

Figure 11:
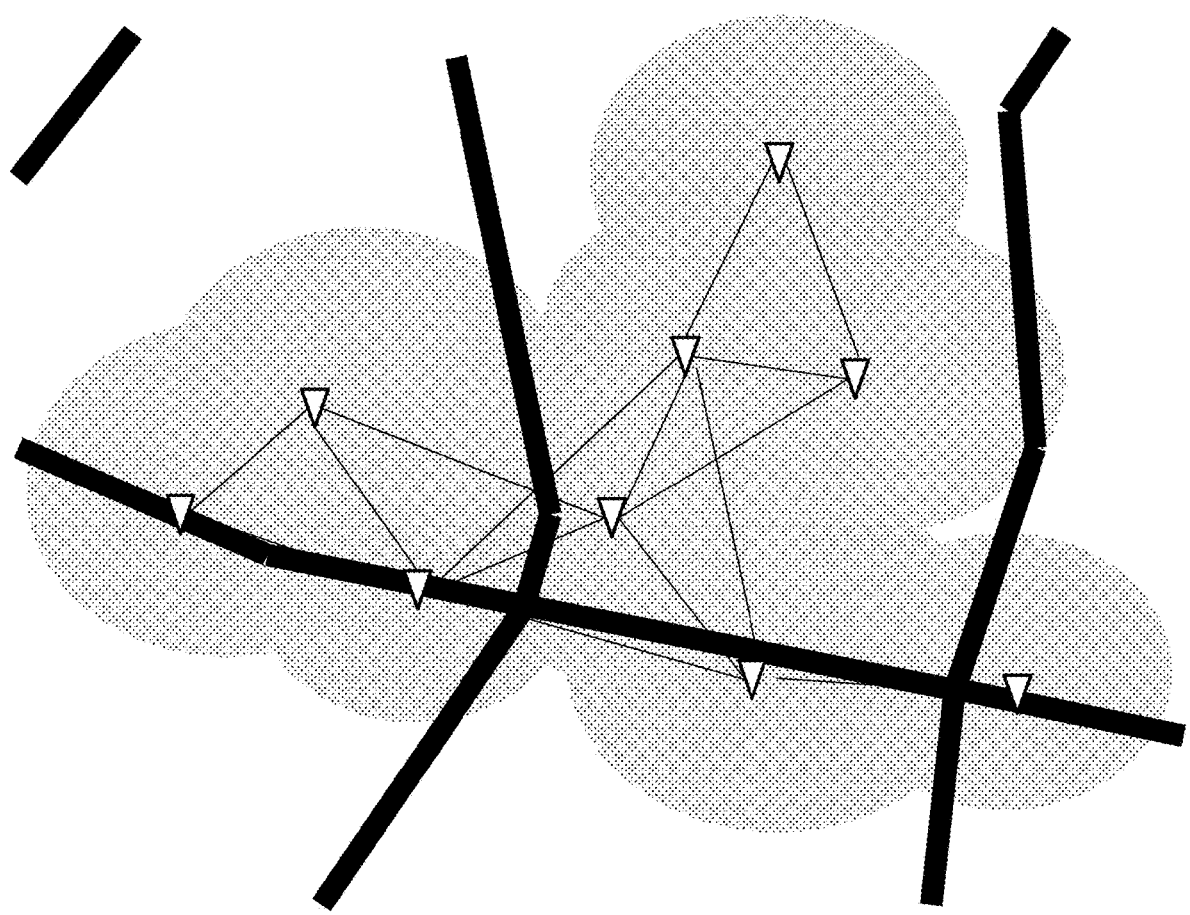
FIG. 11 is a coverage map generated by the Wi-Fi network manager.

In some embodiments, the Wi-Fi network manager 302 provides coverage maps. Note that all APs (as well as clients) constantly monitor the wireless medium and attempt to decode all ongoing transmissions. As part of the decoding process, channel estimation is performed and thus the total received power from the transmitter of the ongoing transmission is determined. Thus, an AP will typically measure the RSSI from all APs and their clients operating on the same channel, as long as the packets transmitted by them can be received at sufficient received power. By cycling through different channels periodically, the AP can measure the channel gains to neighboring APs and their clients on all channels. This information, along with channel propagation models and client location information—determined by GPS if available, or estimated via intersections of location contours based on time-difference of arrival, angle-of-arrival, or connection-trajectory estimates—are used by the Wi-Fi network manager 302 to create SINR measurements at all client locations and the associated throughput and coverage maps, as illustrated in FIGS. 6 and 11.

Distributed Wi-Fi System

Figure 12:
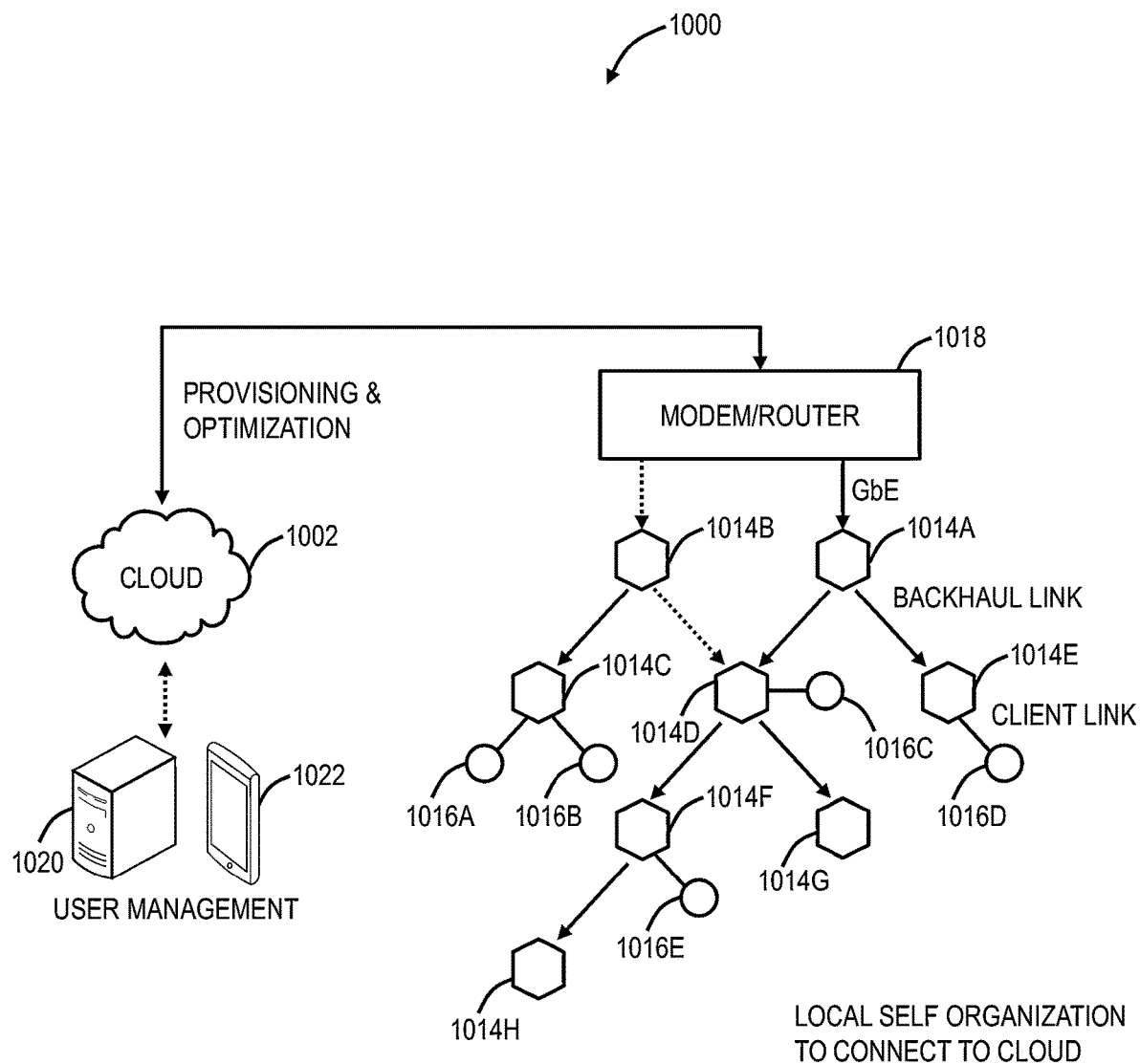
FIG. 12 is a network diagram of a distributed Wi-Fi system with cloud-based control.

Referring to FIG. 12, in an exemplary embodiment, a network diagram illustrates a distributed Wi-Fi system 1000 with cloud-based 1002 control. The distributed Wi-Fi system 1000 can operate in accordance with the IEEE 802.11 protocols and variations thereof. The distributed Wi-Fi system 1000 includes a plurality of access points 1014 (labeled as access points 1014A-1014H) which can be distributed throughout a location, such as a residence, office, or the like. That is, the distributed Wi-Fi system 1000 contemplates operation in any physical location where it is inefficient or impractical to service with a single access point, repeaters, or a mesh system. As described herein, the distributed Wi-Fi system 1000 can be referred to as a network, a system, a Wi-Fi network, a Wi-Fi system, a cloud-based system, etc. The access points 1014 can be referred to as nodes, access points, Wi-Fi nodes, Wi-Fi access points, etc. The objective of the access points 1014 is to provide network connectivity to Wi-Fi client devices 1016 (labeled as Wi-Fi client devices 1016A-1016E). The Wi-Fi client devices 1016 can be referred to as client devices, user devices, clients, Wi-Fi clients, Wi-Fi devices, etc.

In a typical residential deployment, the distributed Wi-Fi system 1000 can include between 3 to 12 access points or more in a home. A large number of access points 1014 (which can also be referred to as nodes in the distributed Wi-Fi system 1000) ensures that the distance between any access point 1014 is always small, as is the distance to any Wi-Fi client device 1016 needing Wi-Fi service. That is, an objective of the distributed Wi-Fi system 1000 is for distances between the access points 1014 to be of similar size as distances between the Wi-Fi client devices 1016 and the associated access point 1014. Such small distances ensure that every corner of a consumer's home is well covered by Wi-Fi signals. It also ensures that any given hop in the distributed Wi-Fi system 1000 is short and goes through few walls. This results in very strong signal strengths for each hop in the distributed Wi-Fi system 1000, allowing the use of high data rates, and providing robust operation. Note, those skilled in the art will recognize the Wi-Fi client devices 1016 can be mobile devices, tablets, computers, consumer electronics, home entertainment devices, televisions, or any network-enabled device. For external network connectivity, one or more of the access points 1014 can be connected to a modem/router 1018 which can be a cable modem, Digital Subscriber Loop (DSL) modem, or any device providing external network connectivity to the physical location associated with the distributed Wi-Fi system 1000.

While providing excellent coverage, a large number of access points 1014 (nodes) presents a coordination problem. Getting all the access points 1014 configured correctly and communicating efficiently requires centralized control. This control is preferably done on servers 1020 that can be reached across the Internet (the cloud 1012) and accessed remotely such as through an application ("app") running on a user device 1022. The running of the distributed Wi-Fi system 1000, therefore, becomes what is commonly known as a "cloud service." The servers 1020 are configured to receive measurement data, to analyze the measurement data, and to configure the access points 1014 in the distributed Wi-Fi system 1000 based thereon, through the cloud 1012. The servers 1020 can also be configured to determine which access point 1014 each of the Wi-Fi client devices 1016 connect (associate) with. That is, in an exemplary aspect, the distributed Wi-Fi system 1000 includes cloud-based control (with a cloud-based controller or cloud service) to optimize, configure, and monitor the operation of the access points 1014 and the Wi-Fi client devices 1016. This cloud-based control is contrasted with a conventional operation which relies on a local configuration such as by logging in locally to an access point. In the distributed Wi-Fi system 1000, the control and optimization does not require local login to the access point 1014, but rather the user device 1022 (or a local Wi-Fi client device 1016) communicating with the servers 1020 in the cloud 1012, such as via a disparate network (a different network than the distributed Wi-Fi system 1000) (e.g., LTE, another Wi-Fi network, etc.).

The access points 1014 can include both wireless links and wired links for connectivity. In the example of FIG. 12, the access point 1014A has an exemplary gigabit Ethernet (GbE) wired connection to the modem/router 1018. Optionally, the access point 1014B also has a wired connection to the modem/router 1018, such as for redundancy or load balancing. Also, the access points 1014A, 1014B can have a wireless connection to the modem/router 1018. The access points 1014 can have wireless links for client connectivity (referred to as a client link) and for backhaul (referred to as a backhaul link). The distributed Wi-Fi system 1000 differs from a conventional Wi-Fi mesh network in that the client links and the backhaul links do not necessarily share the same Wi-Fi channel, thereby reducing interference. That is, the access points 1014 can support at least two Wi-Fi wireless channels—which can be used flexibly to serve either the client link or the backhaul link and may have at least one wired port for connectivity to the modem/router 1018, or for connection to other devices. In the distributed Wi-Fi system 1000, only a small subset of the access points 1014 require direct connectivity to the modem/router 1018 with the non-connected access points 1014 communicating with the modem/router 1018 through the backhaul links back to the connected access points 1014.

Distributed Wi-Fi System Compared to Conventional Wi-Fi Systems

Figure 13:
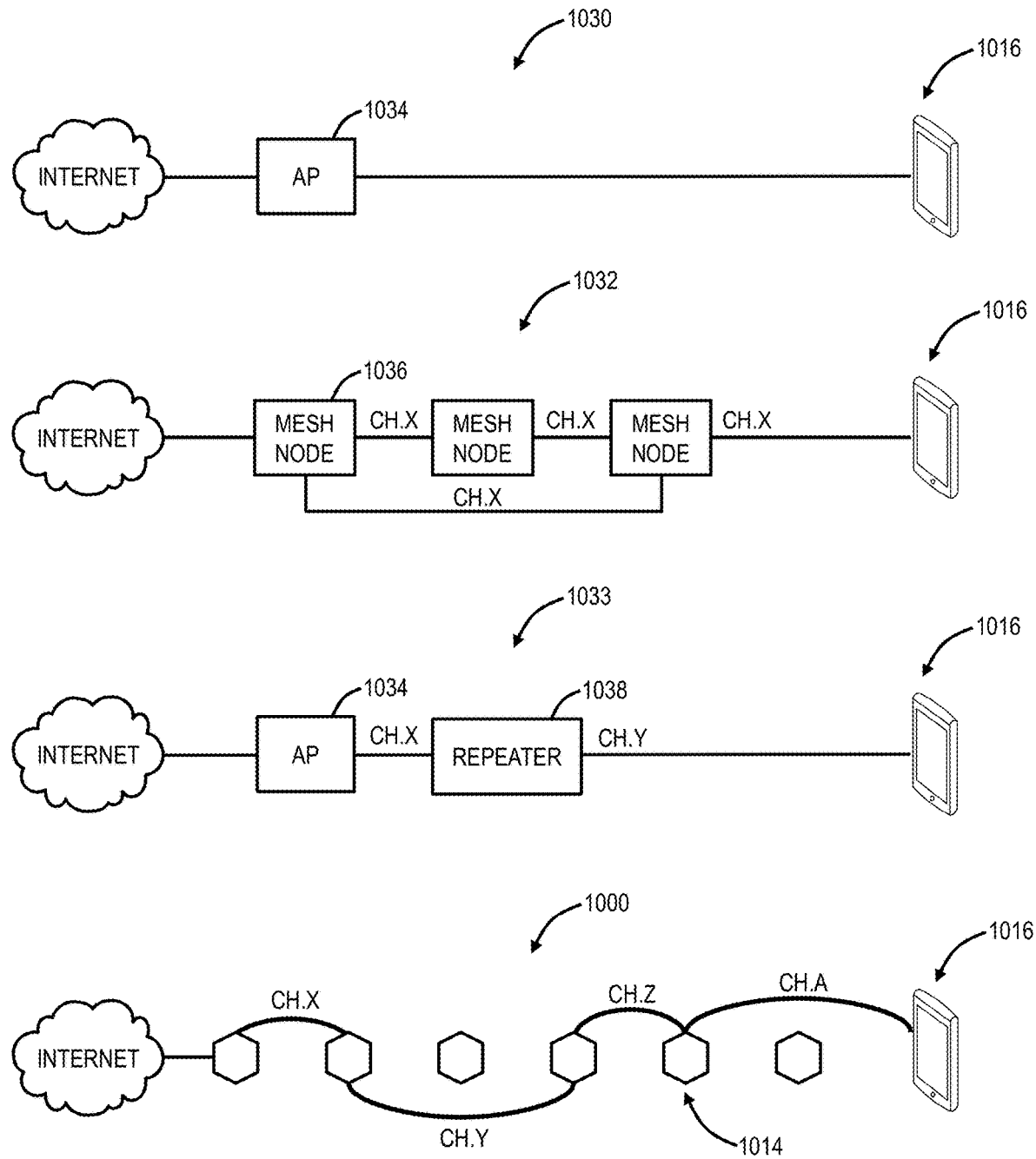
FIG. 13 is a network diagram of differences in operation of the distributed Wi-Fi system of FIG. 12 relative to a conventional single access point system, a Wi-Fi mesh network, and a Wi-Fi repeater system.

Referring to FIG. 13, in an exemplary embodiment, a network diagram illustrates differences in operation of the distributed Wi-Fi system 1000 relative to a conventional single access point system 1030, a Wi-Fi mesh network 1032, and a Wi-Fi repeater network 1033. The single access point system 1030 relies on a single, high-powered access point 1034 which may be centrally located to serve all Wi-Fi client devices 1016 in a location (e.g., house). Again, as described herein, in a typical residence, the single access point system 1030 can have several walls, floors, etc. between the access point 1034 and the Wi-Fi client devices 1016. Plus, the single access point system 1030 operates on a single channel, leading to potential interference from neighboring systems. The Wi-Fi mesh network 1032 solves some of the issues with the single access point system 1030 by having multiple mesh nodes 1036 which distribute the Wi-Fi coverage. Specifically, the Wi-Fi mesh network 1032 operates based on the mesh nodes 1036 being fully interconnected with one another, sharing a channel such as a channel X between each of the mesh nodes 1036 and the Wi-Fi client device 1016. That is, the Wi-Fi mesh network 1032 is a fully interconnected grid, sharing the same channel, and allowing multiple different paths between the mesh nodes 1036 and the Wi-Fi client device 1016. However, since the Wi-Fi mesh network 1032 uses the same backhaul channel, every hop between source points divides the network capacity by the number of hops taken to deliver the data. For example, if it takes three hops to stream a video to a Wi-Fi client device 1016, the Wi-Fi mesh network 1032 is left with only ⅓ the capacity. The Wi-Fi repeater network 1033 includes the access point 1034 coupled wirelessly to a Wi-Fi repeater 1038. The Wi-Fi repeater network 1033 is a star topology where there is at most one Wi-Fi repeater 1038 between the access point 1014 and the Wi-Fi client device 1016. From a channel perspective, the access point 34 can communicate to the Wi-Fi repeater 1038 on a first channel, Ch. X, and the Wi-Fi repeater 1038 can communicate to the Wi-Fi client device 1016 on a second channel, Ch. Y.

The distributed Wi-Fi system 1000 solves the problem with the Wi-Fi mesh network 1032 of requiring the same channel for all connections by using a different channel or band for the various hops (note, some hops may use the same channel/band, but it is not required), to prevent slowing down the Wi-Fi speed. For example, the distributed Wi-Fi system 1000 can use different channels/bands between access points 1014 and between the Wi-Fi client device 1016 (e.g., Chs. X, Y, Z, A), and, also, the distributed Wi-Fi system 1000 does not necessarily use every access point 1014, based on configuration and optimization by the cloud 1012. The distributed Wi-Fi system 1000 solves the problems of the single access point system 1030 by providing multiple access points 1014. The distributed Wi-Fi system 1000 is not constrained to a star topology as in the Wi-Fi repeater network 1033 which at most allows two wireless hops between the Wi-Fi client device 1016 and a gateway. Also, the distributed Wi-Fi system 1000 forms a tree topology where there is one path between the Wi-Fi client device 1016 and the gateway, but which allows for multiple wireless hops unlike the Wi-Fi repeater network 1033.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 1000. By selecting different Wi-Fi channels between the access points 1014, interference and congestion are avoided. The server 1020 through the cloud 12 automatically configures the access points 14 in an optimized channel hop solution. The distributed Wi-Fi system 1000 can choose routes and channels to support the ever-changing needs of consumers and their Wi-Fi client devices 1016. The distributed Wi-Fi system 1000 approach is to ensure Wi-Fi signals do not need to travel far—either for backhaul or client connectivity. Accordingly, the Wi-Fi signals remain strong and avoid interference by communicating on the same channel as in the Wi-Fi mesh network 1032 or with Wi-Fi repeaters. In an exemplary aspect, the servers 1020 in the cloud 1012 are configured to optimize channel selection for the best user experience.

Configuration and Optimization Process for the Distributed Wi-Fi System

Figure 14:
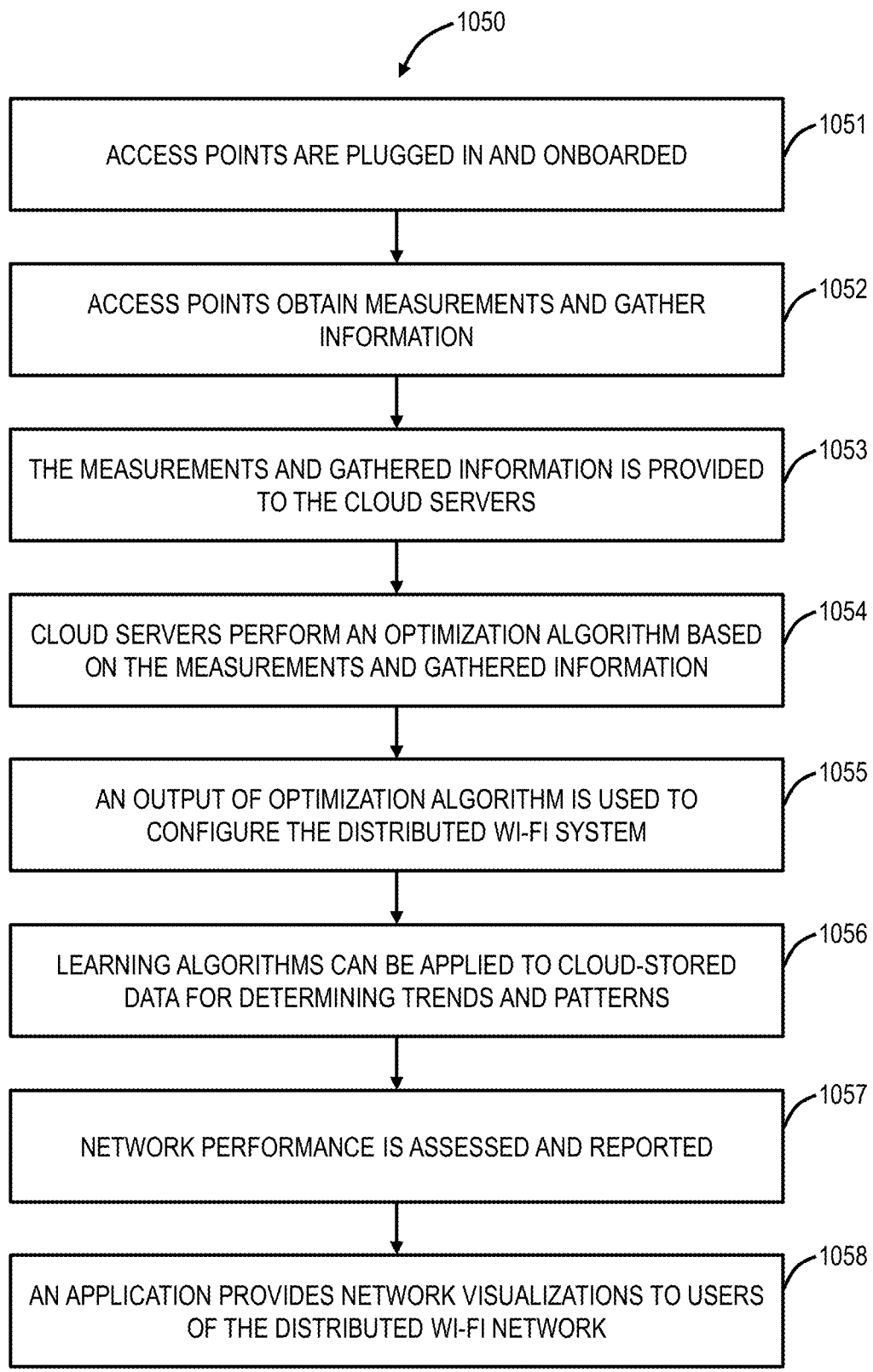
FIG. 14 is a flowchart of a configuration and optimization process for the distributed Wi-Fi system of FIG. 12.

Referring to FIG. 14, in an exemplary embodiment, a flowchart illustrates a configuration and optimization process 1050 for the distributed Wi-Fi system 1000. Specifically, the configuration and optimization process 1050 includes various steps 1051-1058 to enable efficient operation of the distributed Wi-Fi system 1000. These steps 1051-1058 may be performed in a different order and may be repeated on an ongoing basis, allowing the distributed Wi-Fi system 1000 to adapt to changing conditions. First, each of the access points 1014 are plugged in and onboarded (step 1051). In the distributed Wi-Fi system 1000, only a subset of the access points 1014 are wired to the modem/router 1018 (or optionally with a wireless connection to the modem/router 1018), and those access points 1014 without wired connectivity have to be onboarded to connect to the cloud 1012. The onboarding step 1051 ensures a newly installed access point 1014 connects to the distributed Wi-Fi system 1000 so that the access point can receive commands and provide data to the servers 1020. The onboarding step 1051 can include configuring the access point with the correct Service Set Identifier (SSID) (network ID) and associated security keys. In an exemplary embodiment, the onboarding step 1051 is performed with Bluetooth or equivalent connectivity between the access point 1014 and a user device 1022 allowing a user to provide the SSID, security keys, etc. Once onboarded, the access point 1014 can initiate communication over the distributed Wi-Fi system 1000 to the servers 1020 for configuration.

Second, the access points 1014 obtain measurements and gather information to enable optimization of the networking settings (step 1052). The information gathered can include signal strengths and supportable data rates between all nodes as well as between all nodes and all Wi-Fi client devices 1016. Specifically, the measurement step 1052 is performed by each access point 1014 to gather data. Various additional measurements can be performed such as measuring an amount of interference, loads (throughputs) required by different applications operating over the distributed Wi-Fi system 1000, etc. Third, the measurements and gathered information from the measurement step 1052 is provided to the servers 1020 in the cloud 1012 (step 1053). The steps 1051-1053 are performed on location at the distributed Wi-Fi system 1000.

These measurements in steps 1052, 1053 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 1020 in the cloud 1012 use the measurements to perform an optimization algorithm for the distributed Wi-Fi system 1000 (step 1054). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 1000 (step 1055). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 1000. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 1000. The optimization tries to use the lowest possible channel bandwidth for each link that will support the load required by the various user's applications. By using the narrowest sufficient throughput channels, the maximum number of non-interfering channels are left over for other links within the distributed Wi-Fi system 1000.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 1000 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 1000, meaning which nodes connect to which other nodes. The actual route through the distributed Wi-Fi system 1000 between two clients or the client and the Internet gateway (modem/router 1018) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 1056). Note, the servers 1020 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 1057). Eighth, an application (such as a mobile app operating on the user device 1022) can provide a user visibility into the network operation (step 1058). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 1050 is described herein with reference to the distributed Wi-Fi system 1000 as an exemplary embodiment. Those skilled in the art will recognize the configuration and optimization process 1050 can operate with any type of multiple node Wi-Fi system including the Wi-Fi mesh network 1032, the Wi-Fi repeater network 1033, etc. For example, cloud-based control can also be implemented in the Wi-Fi mesh network 1032, the Wi-Fi repeater network 1033, etc. and the various systems and methods described herein can operate as well here for cloud-based control and optimization. Also, the terminology "distributed Wi-Fi network" can also apply to the Wi-Fi mesh network 1032, the Wi-Fi repeater network 1033, etc. whereas the distributed Wi-Fi system 1000 is a specific embodiment of a distributed Wi-Fi network. That is the distributed Wi-Fi system 1000 is similar to the Wi-Fi mesh network 1032, the Wi-Fi repeater network 1033, etc. in that it does support multiple nodes, but it does have the aforementioned distinctions to overcome limitations associated with each.

Optimization

Figure 15:
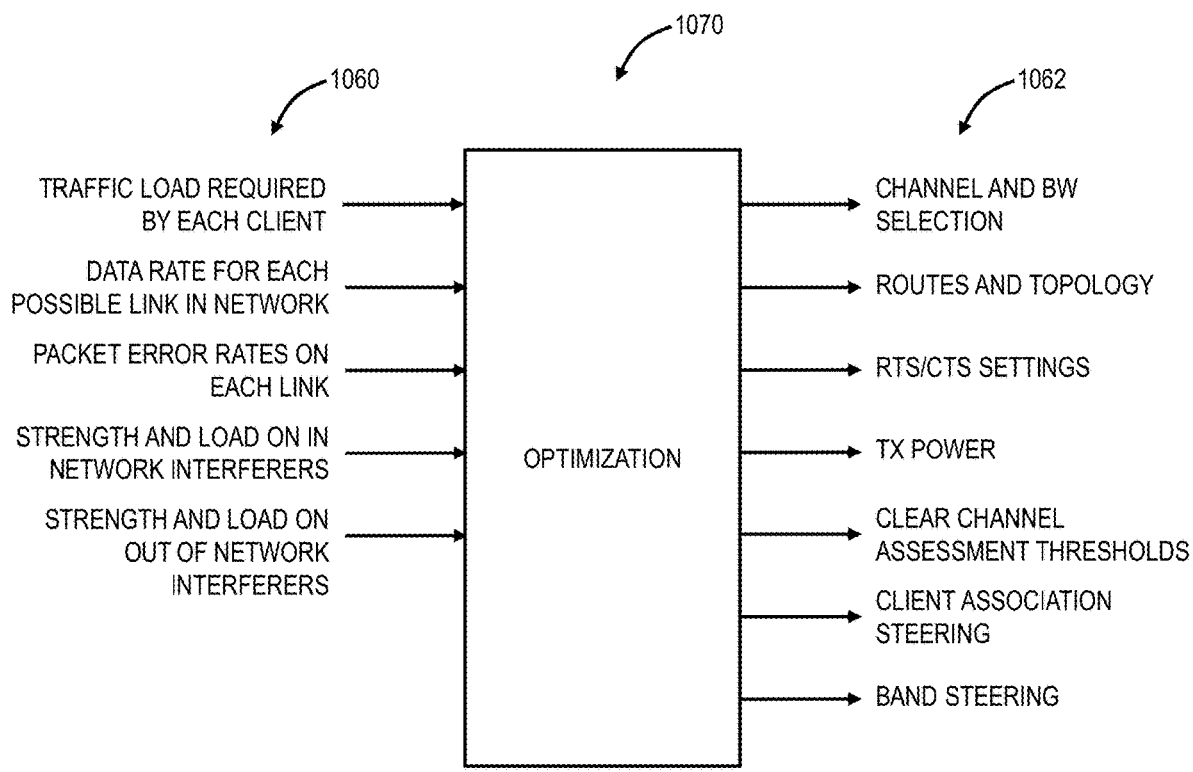
FIG. 15 is a block diagram of inputs and outputs to an optimization as part of the configuration and optimization process of FIG. 14.

Referring to FIG. 15, in an exemplary embodiment, a block diagram illustrates inputs 1060 and outputs 1062 to an optimization 1070. The inputs 1060 can include, for example, traffic load required by each client, signal strengths between nodes and between access points 1014 (nodes) and Wi-fi client devices 1016, data rate for each possible link in the network, packet error rates on each link, strength and load on in-network interferers, and strength and load on out-of-network interferers. Again, these inputs are based on measurements and data gathered by the plurality of access points 1014 and communicated to the servers 1020 in the cloud 1012. The servers 1020 are configured to implement the optimization 1070. The outputs of the optimization 1070 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 16:
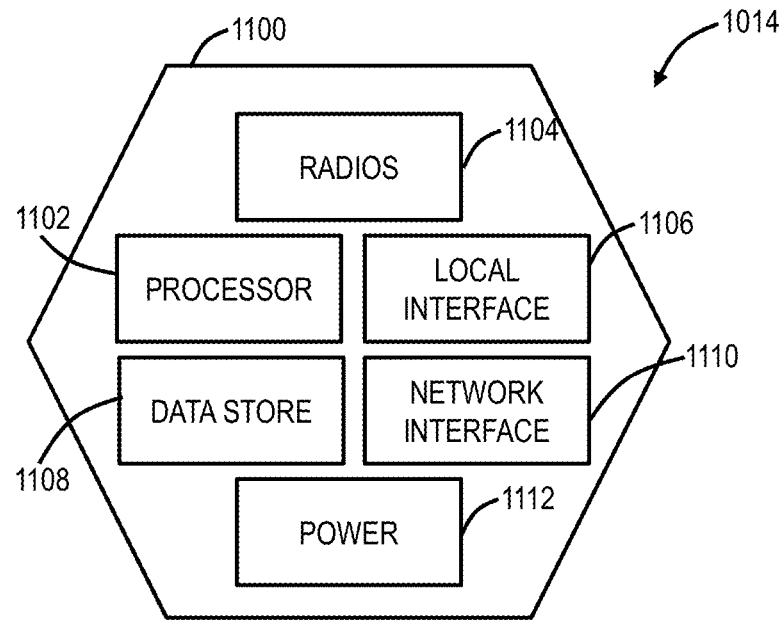
FIG. 16 is a block diagram of functional components of the access point in the distributed Wi-Fi system of FIG. 12.

Referring to FIG. 16, in an exemplary embodiment, a block diagram illustrates functional components of the access point 1014 in the distributed Wi-Fi system 1000. The access point 1014 includes a physical form factor 1100 which contains a processor 1102, a plurality of radios 1104, a local interface 1106, a data store 1108, a network interface 1110, and power 1112. It should be appreciated by those of ordinary skill in the art that FIG. 16 depicts the access point 1014 in an oversimplified manner, and a practical embodiment may include additional components and suitably configured processing logic to support features described herein or known or conventional operating features that are not described in detail herein.

In an exemplary embodiment, the form factor 1100 is a compact physical implementation where the access point 1014 directly plugs into an electrical socket and is physically supported by the electrical plug connection to the electrical socket. This compact physical implementation is ideal for a large number of access points 1014 distributed throughout a residence. The processor 1102 is a hardware device for executing software instructions. The processor 1102 can be any custom made or commercially available processor, a central processing unit (CPU), an auxiliary processor among several processors, a semiconductor-based microprocessor (in the form of a microchip or chip set), or generally any device for executing software instructions. When the access point 1014 is in operation, the processor 1102 is configured to execute software stored within memory or the data store 1108, to communicate data to and from the memory or the data store 1108, and to generally control operations of the access point 1014 pursuant to the software instructions. In an exemplary embodiment, the processor 1102 may include a mobile-optimized processor such as optimized for power consumption and mobile applications.

The radios 1104 enable wireless communication in the distributed Wi-Fi system 1000. The radios 1104 can operate according to the IEEE 802.11 standard. The radios 1104 include address, control, and/or data connections to enable appropriate communications on the distributed Wi-Fi system 1000. As described herein, the access point 1014 includes a plurality of radios to support different links, i.e., backhaul links and client links. The optimization 1070 determines the configuration of the radios 1104 such as bandwidth, channels, topology, etc. In an exemplary embodiment, the access points 1014 support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 1014 can support IEEE 802.11AC1200 gigabit Wi-Fi (300+867 Mbps).

The local interface 1106 is configured for local communication to the access point 1014 and can be either a wired connection or wireless connection such as Bluetooth or the like. Since the access points 1014 are configured via the cloud 1012, an onboarding process is required to first establish connectivity for a newly turned on access point 1014. In an exemplary embodiment, the access points 1014 can also include the local interface 1106 allowing connectivity to the user device 1022 (or a Wi-Fi client device 1016) for onboarding to the distributed Wi-Fi system 1000 such as through an app on the user device 1022. The data store 1108 is used to store data. The data store 1108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1108 may incorporate electronic, magnetic, optical, and/or other types of storage media.

The network interface 1110 provides wired connectivity to the access point 1014. The network interface 1104 may be used to enable the access point 1014 communicate to the modem/router 1018. Also, the network interface 1104 can be used to provide local connectivity to a Wi-Fi client device 1016 or user device 1022. For example, wiring in a device to an access point 1014 can provide network access to a device which does not support Wi-Fi. In an exemplary embodiment, all of the access points 1014 in the distributed Wi-Fi system 1000 include the network interface 1110. In another exemplary embodiment, select access points 1014 which connect to the modem/router 1018 or require local wired connections have the network interface 1110. The network interface 1110 may include, for example, an Ethernet card or adapter (e.g., 10BaseT, Fast Ethernet, Gigabit Ethernet, 10 GbE). The network interface 1110 may include address, control, and/or data connections to enable appropriate communications on the network.

The processor 1102 and the data store 1108 can include software and/or firmware which essentially controls the operation of the access point 1014, data gathering and measurement control, data management, memory management, and communication and control interfaces with the server 1020 via the cloud 1012. The processor 1102 and the data store 1108 may be configured to implement the various processes, algorithms, methods, techniques, etc. described herein.

Cloud Server and User Device

Figure 17:
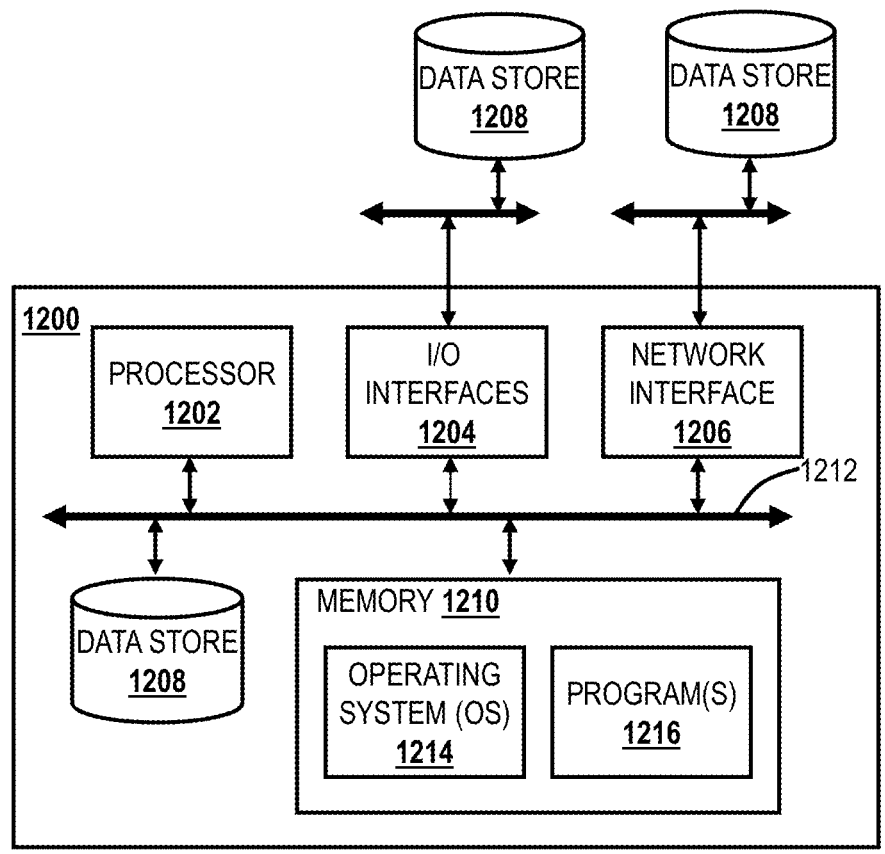
FIG. 17 is a block diagram of functional components of a server, a Wi-Fi client device, or a user device which may be used with the distributed Wi-Fi system of FIG. 12.

Referring to FIG. 17, in an exemplary embodiment, a block diagram illustrates functional components of a processing device 1200 which can include the server 1020, the Wi-Fi client device 1016, or the user device 1022, for use with the distributed Wi-Fi system 1000. FIG. 17 illustrates functional components which can form any of the Wi-Fi client device 1016, the server 1020, the user device 1022, or any general processing device. The processing device 1200 may be a digital computer that, in terms of hardware architecture, generally includes a processor 1202, input/output (I/O) interfaces 1204, a network interface 1206, a data store 1208, and memory 1210. It should be appreciated by those of ordinary skill in the art that FIG. 17 depicts the processing device 1200 in an oversimplified manner, and a practical embodiment may include additional components and suitably configured processing logic to support features described herein or known or conventional operating features that are not described in detail herein.

The components (1202, 1204, 1206, 1208, and 1210) are communicatively coupled via a local interface 1212. The local interface 1212 may be, for example, but not limited to, one or more buses or other wired or wireless connections, as is known in the art. The local interface 1212 may have additional elements, which are omitted for simplicity, such as controllers, buffers (caches), drivers, repeaters, and receivers, among many others, to enable communications. Further, the local interface 1212 may include address, control, and/or data connections to enable appropriate communications among the aforementioned components.

The processor 1202 is a hardware device for executing software instructions. The processor 1202 may be any custom made or commercially available processor, a central processing unit (CPU), an auxiliary processor among several processors associated with the processing device 1200, a semiconductor-based microprocessor (in the form of a microchip or chip set), or generally any device for executing software instructions. When the processing device 1200 is in operation, the processor 1202 is configured to execute software stored within the memory 1210, to communicate data to and from the memory 1210, and to generally control operations of the processing device 1200 pursuant to the software instructions. The I/O interfaces 1204 may be used to receive user input from and/or for providing system output to one or more devices or components. User input may be provided via, for example, a keyboard, touchpad, and/or a mouse. System output may be provided via a display device and a printer (not shown). I/O interfaces 1204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 1206 may be used to enable the processing device 1200 to communicate on a network, such as the cloud 1012. The network interface 1206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 1206 may include address, control, and/or data connections to enable appropriate communications on the network. A data store 1208 may be used to store data. The data store 1208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1208 may incorporate electronic, magnetic, optical, and/or other types of storage media. In one example, the data store 1208 may be located internal to the processing device 1200 such as, for example, an internal hard drive connected to the local interface 1212 in the processing device 1200. Additionally, in another embodiment, the data store 1208 may be located external to the processing device 1200 such as, for example, an external hard drive connected to the I/O interfaces 1204 (e.g., SCSI or USB connection). In a further embodiment, the data store 1208 may be connected to the processing device 1200 through a network, such as, for example, a network attached file server.

The memory 1210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1210 may incorporate electronic, magnetic, optical, and/or other types of storage media. Note that the memory 1210 may have a distributed architecture, where various components are situated remotely from one another but can be accessed by the processor 1202. The software in memory 1210 may include one or more software programs, each of which includes an ordered listing of executable instructions for implementing logical functions. The software in the memory 1210 includes a suitable operating system (O/S) 1214 and one or more programs 1216. The operating system 1214 essentially controls the execution of other computer programs, such as the one or more programs 1216, and provides scheduling, input-output control, file and data management, memory management, and communication control and related services. The one or more programs 1216 may be configured to implement the various processes, algorithms, methods, techniques, etc. described herein, such as related to the optimization 1070.

Optimization Process

Again, referring back to FIG. 15, the optimization 1070 takes as inputs 1060 measurements that are made by each of the access points 1014 deployed throughout a location. These measurements could include, but are not limited to, the traffic load required by each client 1016, the signal strengths and data rate that can be maintained between each of the access points 1014 and from each of the access points 1014 to each of the clients 1016, the packet error rates in the links between the access points 1014 and between the access points 1014 and the clients 1016, etc. In addition, the access points 1014 make measurements of the interference levels affecting the distributed Wi-Fi system 1000. This includes interference from other cloud controlled distributed Wi-Fi systems 1000 ("in-network interferers"), and interference coming from devices that are not part of the controllable network ("out-of-network interferers"). It is important to make a distinction between these types of interferers. In-network interferers can be controlled by the cloud service, and therefore can be included in a large optimization over all in-network systems. Out of network interferers cannot be controlled from the cloud service, and therefore their interference cannot be moved to another channel or otherwise changed. The distributed Wi-Fi system 1000 must adapt around them, rather than changing them. These out-of-network interferers include Wi-Fi networks that are not cloud controlled, and non-Wi-Fi devices that transmit in the frequencies used by Wi-Fi such as Bluetooth devices, baby monitors, cordless phones, etc. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Another important input is the delay of packets traversing the distributed Wi-Fi system 1000. These delays could be derived from direct measurements, time stamping packets as they arrive into the distributed Wi-Fi system 1000 at the gateway access point 1014 (connected to the modem/router 1018), and measuring the elapsed time as they depart at the access point 1014. However, such measurement would require some degree of time synchronization between the access points 1014. Another approach would be to measure the statistics of delay going through each access point 1014 individually. The average total delay through the distributed Wi-Fi system 1000, and the distribution of the delays given some assumptions could then be calculated based on the delay statistics through each access point 1014 individually. Delay can then become a parameter to be minimized in the optimization 1070. It is also useful for the optimization 1070 to know the time that each access point 1014 spends transmitting and receiving. Together with the amount of information transmitted or received, this can be used to determine the average data rate the various links are sustaining.

The outputs 1062 of the optimization 1070 are the operational parameters for the distributed Wi-Fi system 1000. This includes the frequency channels on which each of the access points 1014 are operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 1000. The optimization 1070 tries to use the lowest possible channel bandwidth for each link that will support the load required by the various user's applications. By using the narrowest sufficient throughput channels, the maximum number of non-interfering channels are left over for other links within the distributed Wi-Fi system 1000.

Another set of outputs 1062 of the optimization 1070 defines the topology of the distributed Wi-Fi system 1000, meaning which access points 1014 connect to which other access points 1014. The actual route through the distributed Wi-Fi system 1000 between two clients or the client and the internet gateway (the modem/router 1018) is also an output of the optimization 1070. Again, the optimization 1070 attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the distributed Wi-Fi system 1000. The method of optimizing described later takes all this into account and comes up with the truly optimal arrangement.

The optimization 1070 can also decide which links within the distributed Wi-Fi system 1000 should use RTS/CTS protocols to prevent problems with hidden nodes, and can adjust each access point's 1014 transmit power level. Higher transmit power increases the data rate and throughput for links from that access points 1014, but creates more interference to other access points 1014 in the distributed Wi-Fi system 1000 and to neighboring systems. Closely associated to changing the transmit power, the optimization 1070 can also set the clear channel assessment threshold at which it either defers to traffic on the airwaves, or goes ahead and transmits on top of other transmissions. This is effectively a way to ignore transmissions from a neighboring network and not delay transmissions when conditions allow us to transmit on top of those other signals.

A large benefit in system performance can be obtained if the optimization 1070 is allowed to choose which access points 1014 each Wi-Fi client device 1016 connects to in the home. This ability helps with several issues. First, Wi-Fi client devices 1016 often do a poor job of roaming from an access point 1014 they have been connected to, to an access point 14 that they may have moved closer to. These "sticky" clients will experience unnecessarily low throughput as they attempt to communicate with an access point 1014 that is too far away. Another advantage to controlling client associations is to avoid congestion at particular access points 1014 in the distributed Wi-Fi system 1000. For example, all the Wi-Fi client devices 1016 in the home might be located closest to one particular access point 1014. Their throughput would be limited by the sharing of the total capacity of that one access point 1014. In this case, it would work better to force some of the Wi-Fi client devices 1016 to associate with different access points 1014, even if those access points 1014 are somewhat farther away. The capacity at each access point 1014 is now shared among fewer Wi-Fi client devices 1016, allowing higher throughputs to each. Yet another reason to move Wi-Fi client devices 1016 is to relieve congestion in the backhaul links. It is possible that even if the Wi-Fi client devices 1016 spread themselves nicely between access points 1014, all of those access points 1014 may in turn connect to a single access point 1014 in the backhaul. In this case the congestion will be in the backhaul. Again, moving the Wi-Fi client devices 1016 to other access points 1014, that have a different path through the backhaul can relieve the congestion.

Closely related to steering where Wi-Fi client devices 1016 associate, is steering which frequency band clients connect on. In many systems and the preferred implementation, the access points 1014 can operate simultaneously in more than one frequency band. For example, some access points 1014 can operate in the 2.4 GHz and 5 GHz bands simultaneously.

The optimization 1070 generates the outputs 1062 from the inputs 1060 as described herein by maximizing an objective function. There are many different possible objective functions. One objective could be to maximize the total throughput provided to all the Wi-Fi client devices 1016. This goal has the disadvantage that the maximum total throughput might be achieved by starving some Wi-Fi client devices 1016 completely, in order to improve the performance to Wi-Fi client devices 16 that are already doing well. Another objective could be to enhance as much as possible the performance for the Wi-Fi client devices 1016 in the network in the worst situation (maximize the minimum throughput to a Wi-Fi client device 1016). This goal helps promote fairness, but might trade a very large amount of total capacity for an incremental improvement at the worst Wi-Fi client device 1016.

Figure 18:
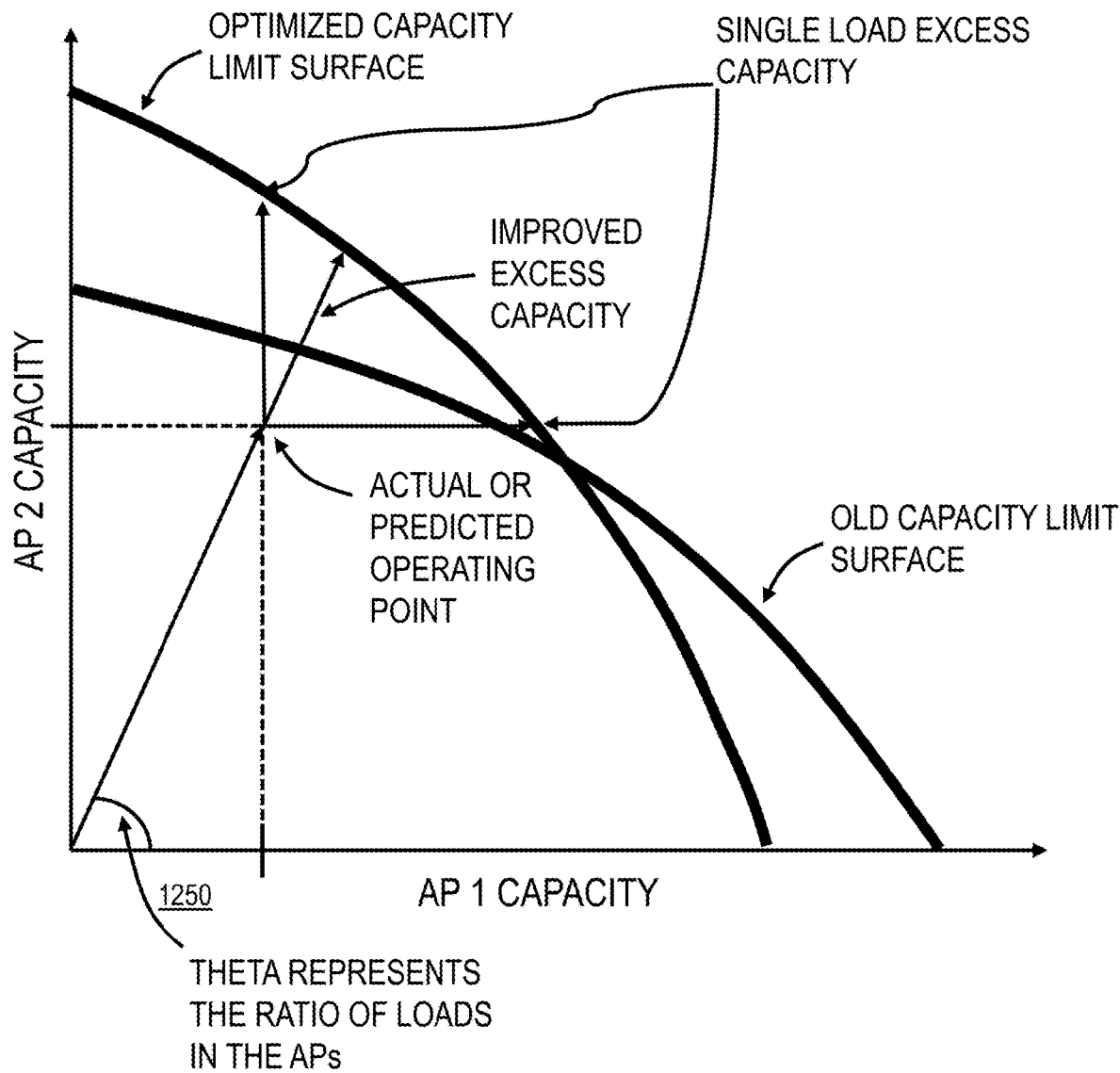
FIG. 18 is a graph of capacity loads of two access points relative to one another.

Referring to FIG. 18, in an exemplary embodiment, a graph illustrates capacity loads of two access points 1014 relative to one another. A preferred method considers the load desired by each Wi-Fi client device 1016 in a network, and maximizing the excess capacity for that load ratio. FIG. 18 illustrates this approach where the capacity requirements at two different access points 1014 is shown. The optimization can improve the capacity, as well as shift the capacity between the two access points 1014. The desired optimization 1070 is the one that maximizes the excess capacity in the direction of a ratio 1250 of the loads. This represents giving the system the most margin to carry the desired loads, making the performance more robust, lower latency, and lower jitter. This strict optimization can be further enhanced by providing a softer optimization function that weighs assigning capacities with a varying scale. A high utility value would be placed on getting the throughput to be equal to or just higher than the required load. Providing throughput to a Wi-Fi client device 1016 or access point 1014 above the required load would still be considered a benefit, but would be weighted much less heavily than getting all the Wi-Fi client devices 1016/access points 1014 to the load they are requiring. Such a soft weighted optimization function allows for a more intuitive tradeoff of excess performance between devices.

The aforementioned approach emphasizes optimizing with knowledge of the desired load. The desired load could be communicated directly by the access points 1014 if they know it. It also could be estimated over a recent time period (e.g., the last few minutes). The load could also be estimated from long-term historical data. For example, the loads recorded across the last 30 days could be used to determine an expected load, which would then be used in the optimization 1070. In this way, the network would be pre-configured for an expected worst-case load.

However, there may be times when the load cannot be known. For example, when a new network is just set up, there is neither long-term load history, short term (e.g., 5 minutes) load requirements, nor would the access points 1014 have any knowledge of what loads the Wi-Fi client devices 1016 in the environment are requiring. In this case, it is necessary to optimize without load information. A reasonable approach is to optimize under the assumption that the load requirement at each access point 1014 is equivalent.

Even if the load is known, it may be beneficial to manipulate the load artificially. For example, recent history, or even long-term history, may predict that the load on a particular access point 1014 is going to be zero. However, there is still the chance that someone may go into that room and try to get data to a Wi-Fi client device 1016 over the distributed Wi-Fi system 1000. Therefore, it is beneficial to reserve a minimum load for each Wi-Fi client device 1016 or access point 1014, to ensure that there is at least some capacity in all locations to handle rare events gracefully.

Other factors can be put into the objective function. For example, certain types of changes to the distributed Wi-Fi system 1000 are highly disruptive, interrupting traffic in the distributed Wi-Fi system 11000 0 while the changes are made. A cost could be added to the objective function that would represent the disadvantage of making certain types of changes to the distributed Wi-Fi system 1000. By properly weighting this cost versus the other factors, the objective function can be tuned to induce the optimization 1070 to change the distributed Wi-Fi system 1000 configuration when there is a lot to be gained, but to leave the distributed Wi-Fi system 1000 alone when the gains would be only modest. Similarly, a hysteresis threshold could be applied to the optimization 1070 output, ensuring that the distributed Wi-Fi system 1000 sits relatively stable rather than flipping back and forth between two configurations at the smallest change in circumstances.

Figure 19:
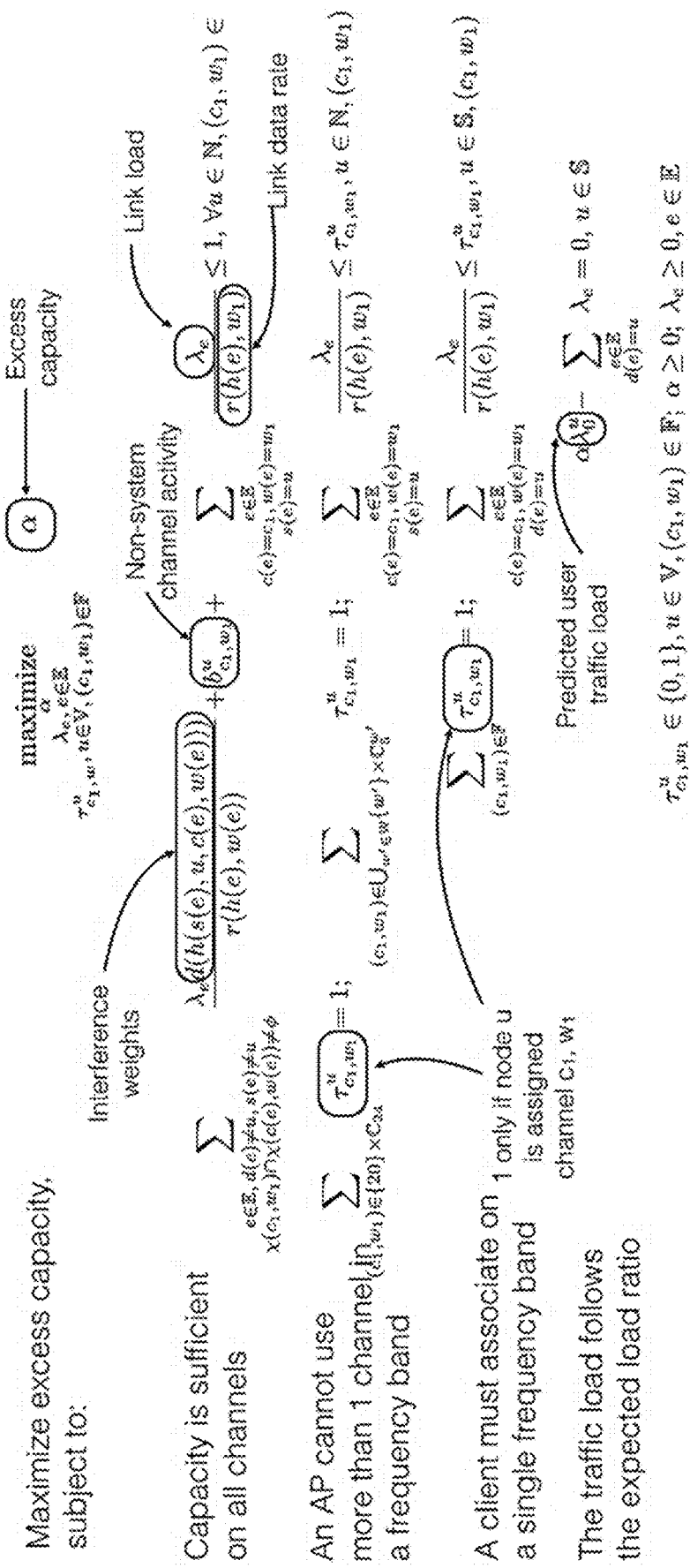
FIG. 19 is equations of an example Mixed Integer Linear Program (MILP) for the optimization.

Referring to FIG. 19, in an exemplary embodiment, equations illustrate an example Mixed Integer Linear Program (MILP) for the optimization 1070. With the inputs 1060, and objective function known, it becomes a mathematical problem to find the set of outputs 1062 that will maximize the objective function. A very efficient way of doing this is to formulate the problem as a Mixed Integer Linear Program (MILP). There are several advantages to this formulation. First, it fits the nature of the problem as there are both continuous and discrete variables involved. For example, channel selection is an integer variable. Second, efficient methods for solving MILP problems are well known. Third, the formulation is fairly generic, accommodating a wide variety of objective functions and constraints on the solution. FIG. 19 shows a mathematical representation of an example MILP formulation, with annotations describing the various elements of the equations.

Ideally, this optimization would be done across not a single home, but all homes that are within Wi-Fi range of each other, and therefore generate interference to each other. Of course, the homes that interfere with the first home have themselves interferers that are even farther away. Proceeding in this way could result in attempting to optimize a very large number of homes all in a single optimization, for example, all homes in Manhattan. The computation time for MILP solutions goes up exponentially with the number parameters being optimized, so it goes up exponentially with the number of homes across which a single optimization is run. A solution to this is to do clustering.

Figure 20:
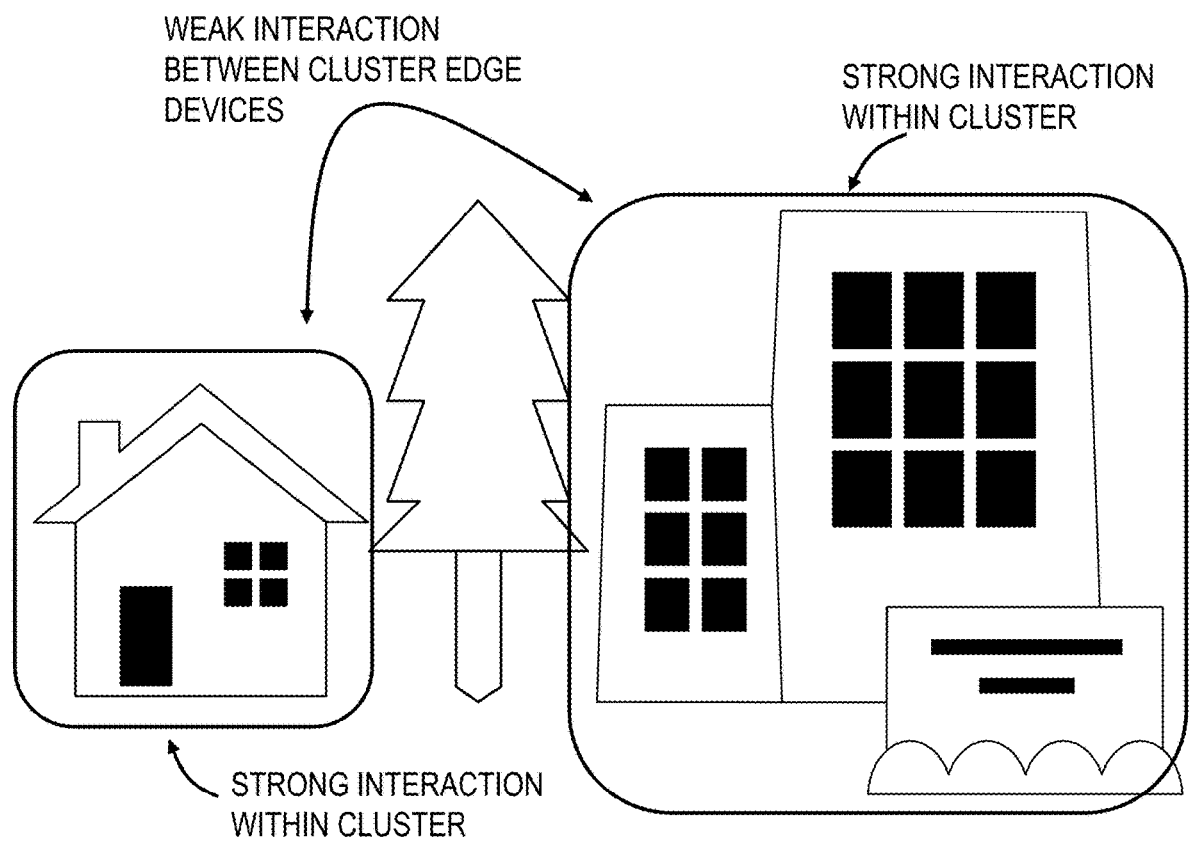
FIG. 20 is a diagram of an example of clustering to reduce the number of homes being jointly optimized, thereby making the computational complexity manageable.

Referring to FIG. 20, in an exemplary embodiment, a diagram illustrates an example of clustering to reduce the number of homes being jointly optimized, thereby making the computational complexity manageable. If the separate clusters still have a high level of overlap at their boundaries, an iterative approach could be applied. In a first pass, it could be assumed there would be no interference between clusters. In a second pass, the interference from the second cluster to the first cluster could be calculated, and then the best configuration for the first cluster re-calculated with that information. The second cluster could then be re-optimized, accounting for the new interference from the first cluster. Because iterations increase the computation load linearly, while cluster size increases computation exponentially, several iterations would still be far less computation than solving the entire problem jointly.

There can be complexities within the optimization 1070. Several optimization parameters will alter the inputs to the optimization 1070 itself. For example, changing the band or channel may change the transmit power that the access points 1014 put out, thereby changing the interference they present to other access points 1014. Similarly, different data rates are often transmitted with different power levels, so as Wi-Fi client device 1016 or access point 1014 associations are changed, interference effects must be recalculated as well.

There are also specific Wi-Fi client device 1016 behaviors to be considered. For example, some Wi-Fi client devices 1016 dynamically switch on a packet by packet basis between different bandwidths of transmission (20, 40, 80 MHz, etc.). Other Wi-Fi client devices 1016 are much less flexible, and if asked to use 40 MHz channels will only send 40 MHz packets. The first group of Wi-Fi client devices 1016 almost always benefit from the allocation of a 40 MHz bandwidth channel, as they will use it when they can, but will also transmit in a lower bandwidth mode if there is interference on a part of the 40 MHz channel. Wi-Fi client devices 1016 in the latter category can only benefit from a 40 MHz channel if that channel has very little interference anywhere on it. The differences between Wi-Fi client device 1016 behaviors is something that can be learned over time from the network measurements that are being reported to the cloud service.

Figure 21:
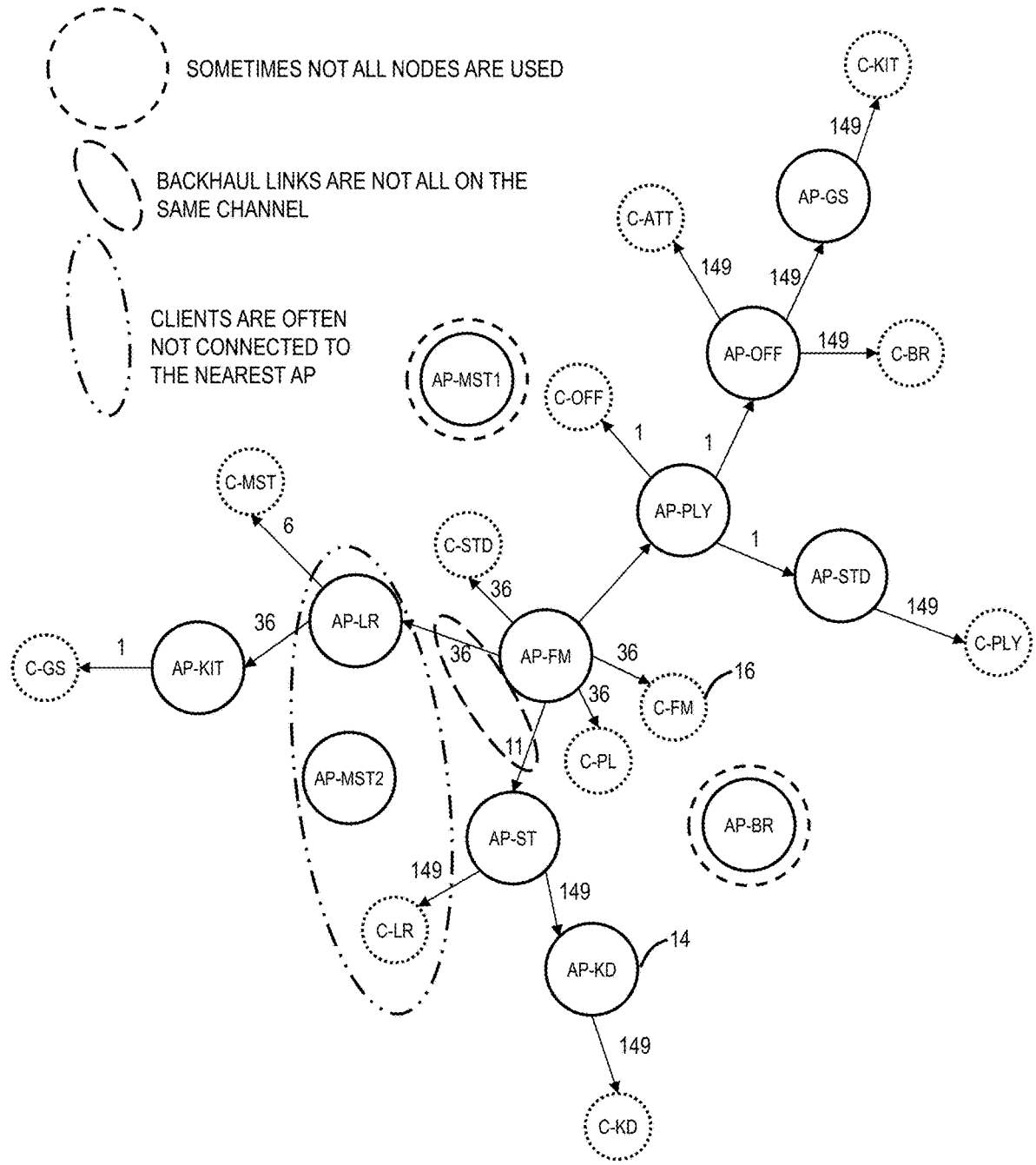
FIG. 21 is a graph of a sample output for the optimization in an exemplary location.

Referring to FIG. 21, in an exemplary embodiment, a graph illustrates a sample output 1062 for the optimization 1070 in an exemplary location. The uniqueness of the optimized distributed Wi-Fi system 1000 can be seen in some of the properties that appear in the optimization 1070 results. FIG. 21 highlights three important aspects of these types of networks that do not occur in prior art Wi-Fi systems using repeaters or mesh networks. First, not all access points 1014 are used. In existing systems, if a repeater or mesh node can communicate back to the master node at all, and if any clients associate with it (perhaps because they are closer to that node than any other node), that pathway will be used. However, that pathway may be a very poor pathway. Imagine a consumer placing a repeater in the very far corner of his house from the gateway/master node. This repeater will become the most difficult and lowest data rate device to connect to in the entire home. It will actually be harder to reach than going directly to any of the clients in the home. However, in existing systems, traffic will be routed through that device. In the distributed Wi-Fi system 101000 the optimization will naturally take this access point 1014 out of the network, not connecting it to any parent nodes, or move all client associations away from that device.

The second important aspect is shown in FIG. 21 is that the backhaul links, those links connecting the access points 1014 together and carrying traffic from and to the master gateway access point 1014 (the one connected to the modem/router 1018), are not all on the same frequency channel. This allows multiple transmissions in the backhaul portion of the network to occur simultaneously since transmissions on different frequencies will not interfere. Existing Wi-Fi systems using repeaters or mesh networks use a single frequency channel for the backhaul. Therefore, only one transmission can be going at any time within the entire backhaul system, limiting throughput and capacity.

The third important aspect is shown in FIG. 21 is that Wi-Fi client devices 1016 are often directed to attach to the access point 1014 that is not the closest access point 1014 to that Wi-Fi client device 1016. This allows load balancing both in the leaf nodes and in the backhaul, as necessary. Current Wi-Fi systems, including systems with repeaters and mesh networks, do not control where the clients associate, and therefore have points of congestion where the performance will be poor.

Figure 22:
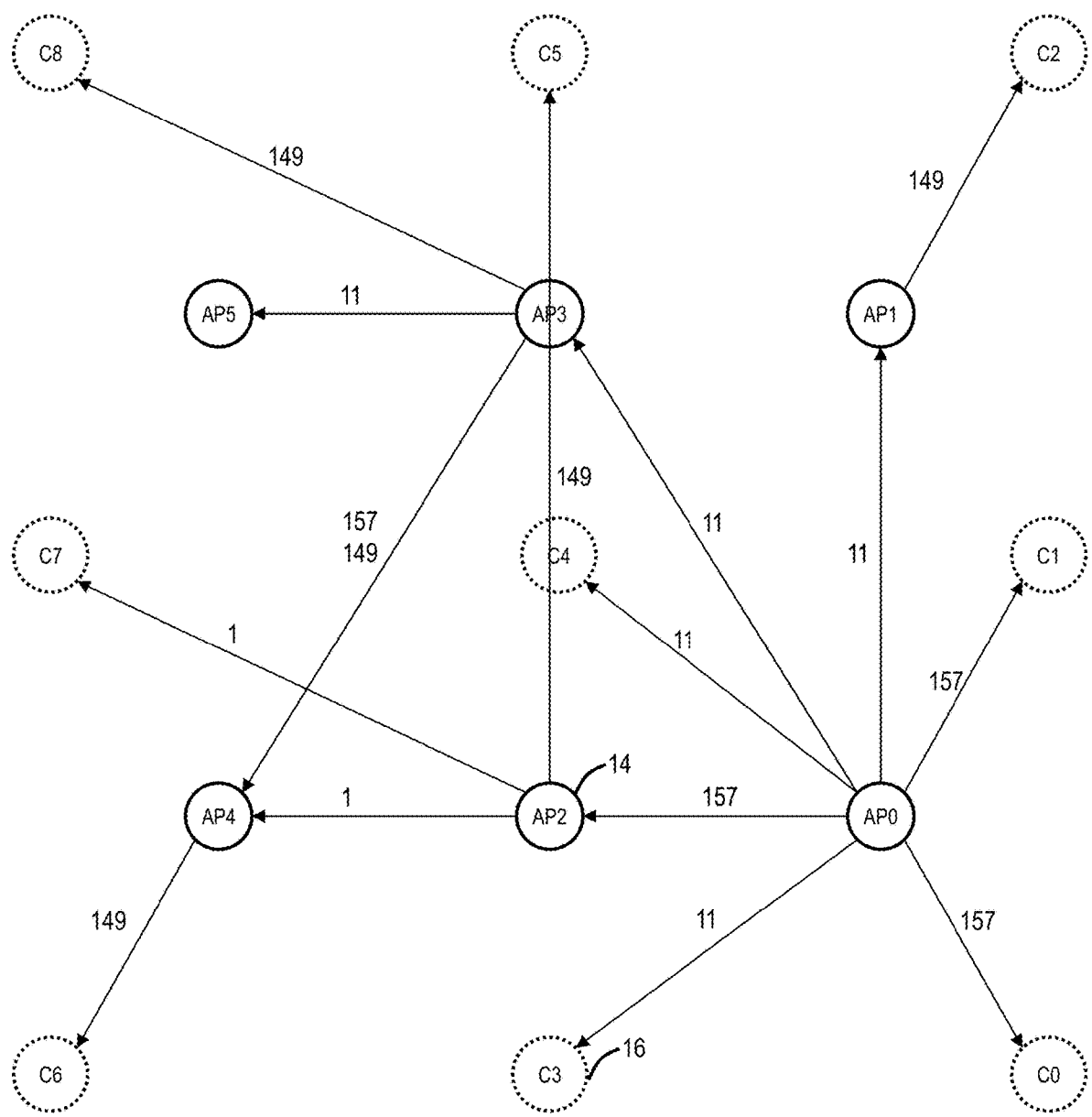
FIG. 22 is a graph of an output of the optimization in a tree structure.

Referring to FIG. 22, in an exemplary embodiment, a graph illustrates an output of the optimization 1070 in a tree structure. The output of the optimization 1070 shown above follows a tree structure. Each access point 1014 has at most one parent. However, a more fully interconnected graph could be formed. FIG. 22 shows an example of a graph structure. The access point 1014 labeled AP3 in this figure has two parent devices, AP4 and AP0. This can be helpful in that more total throughput can be provided to AP3 across the two parallel links from AP4 and AP0 than can be provided if just one of them were connected. In order for this to be effective, a networking protocol must be used that can take advantage of multiple parallel links. An example of such a protocol is Multi-Path Transmission Control Protocol (Multi-Path TCP). This protocol is designed specifically for communicating across multiple paths, and serves well the need to aggregate bandwidth across parallel paths.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   receiving, by a device, inputs related to operations by an access point associated with a network at a location, the inputs comprising information related to characteristics of the network;
   analyzing, by the device, the inputs;
   determining, by the device, operational parameters of the access point, the operational parameters corresponding to an objective function of the network, the objective function maximizing excess capacity for a load ratio of the access point for desired loads of each client connected to the access point; and configuring, by the device, the access point based on the operational parameters, the configuration causing the network to operate at the location in accordance with the objective function.

2. The method of claim 1, further comprising:
providing an output to the access point, the provided output causing the access point to perform the configuration based on the operational parameters.

3. The method of claim 1, wherein the configuration corresponds to a set of network capabilities at the location, the network capabilities being at least one of bandwidth, capacity, power, band steering, channel selection and coverage.

4. The method of claim 1, wherein inputs comprise information related to at least one of signal strength and interference during operation of the network.

5. The method of claim 1, wherein the configuration comprises a topology of the access point within the network.

6. The method of claim 1, further comprising
performing the configuration based on a hysteresis threshold, the hysteresis threshold configured to maintain stability of the network by preventing configuration changes with minor changes in operational circumstances of the network.

7. The method of claim 1, wherein the network is a Wi-Fi network.

8. The method of claim 1, wherein in the device is a controller.

9. The method of claim 1, wherein the controller is in a cloud.

10. The method of claim 1, wherein the location comprises a plurality of access points, wherein the configuration is performed for each of the plurality of access points.

11. A device comprising:
a processor configured to:
receive inputs related to operations by an access point associated with a network at a location, the inputs comprising information related to characteristics of the network;
analyze the inputs;
determine operational parameters of the access point, the operational parameters corresponding to an objective function of the network, the objective function maximizing excess capacity for a load ratio of the access point for desired loads of each client connected to the access point; and
configure, by the device, the access point based on the operational parameters, the configuration causing the network to operate at the location in accordance with the objective function.

12. The device of claim 11, wherein the processor is further configured to:
providing an output to the access point, the provided output causing the access point to perform the configuration based on the operational parameters.

13. The device of claim 11, wherein the configuration corresponds to a set of network capabilities at the location, the network capabilities being at least one of bandwidth, capacity, power, band steering, channel selection and coverage.

14. The device of claim 11, wherein inputs comprise information related to at least one of signal strength and interference during operation of the network.

15. The device of claim 11, wherein the configuration comprises a topology of the access point within the network.

16. A non-transitory computer-readable storage medium tangibly encoded with computer-executable instructions, that when executed by a device on a network, perform a method comprising:
receiving, by the device, inputs related to operations by an access point associated with the network at a location, the inputs comprising information related to characteristics of the network;
analyzing, by the device, the inputs;
determining, by the device, operational parameters of the access point, the operational parameters corresponding to an objective function of the network, the objective function maximizing excess capacity for a load ratio of the access point for desired loads of each client connected to the access point; and
configuring, by the device, the access point based on the operational parameters, the configuration causing the network to operate at the location in accordance with the objective function.

17. The non-transitory computer-readable storage medium of claim 16, further comprising:
providing an output to the access point, the provided output causing the access point to perform the configuration based on the operational parameters.

18. The non-transitory computer-readable storage medium of claim 16, wherein the configuration corresponds to a set of network capabilities at the location, the network capabilities being at least one of bandwidth, capacity, power, band steering, channel selection and coverage.

19. The non-transitory computer-readable storage medium of claim 16, wherein inputs comprise information related to at least one of signal strength and interference during operation of the network.

20. The non-transitory computer-readable storage medium of claim 16, wherein the configuration comprises a topology of the access point within the network.

* * * * *